United States Patent
Mientus et al.

(10) Patent No.: US 6,770,360 B2
(45) Date of Patent: *Aug. 3, 2004

(54) MULTILAYERED THERMOPLASTIC FILM AND SIGN CUTTING METHOD USING THE SAME

(75) Inventors: Bernard S. Mientus, Painesville, OH (US); Kushalkumar M. Baid, Mentor, OH (US); Mark Wisniewski, Mentor, OH (US); Wayne L. Bilodeau, Mentor, OH (US)

(73) Assignee: Avery Dennison Corporation, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/332,273

(22) Filed: Jun. 11, 1999

(65) Prior Publication Data

US 2003/0021930 A1 Jan. 30, 2003

Related U.S. Application Data

(63) Continuation-in-part of application No. 09/096,984, filed on Jun. 12, 1998.

(51) Int. Cl.[7] .......................... B32B 33/00; B32B 21/00
(52) U.S. Cl. ..................... 428/354; 428/40.1; 428/41.7; 428/343; 428/520; 428/522; 428/523
(58) Field of Search .............................. 428/40.1, 41.5, 428/215, 908.8, 447, 500, 354, 343, 41.7, 522, 523, 520

(56) References Cited

U.S. PATENT DOCUMENTS 3,758,192 A * 9/1973 Bingham .................... 350/105
4,163,080 A * 7/1979 Buzio et al. .............. 428/424.8

(List continued on next page.)

FOREIGN PATENT DOCUMENTS

| EP | 416 815 B1 | 3/1991 |
| EP | 520 732 B1 | 12/1992 |

(List continued on next page.)

OTHER PUBLICATIONS

Avery Dennison Marking Films, "Solutions for Fleet Graphics", 1996.

(List continued on next page.)

*Primary Examiner*—Elena Tsoy
(74) *Attorney, Agent, or Firm*—Renner, Otto, Boisselle & Sklar, LLP

(57) ABSTRACT

This invention relates to a multilayered thermoplastic film comprising: a thermoplastic core layer having a first side and a second side, the core layer comprising: a polyolefin having a density in the range of about 0.89 to about 0.97 grams per cubic centimeter; a second polymeric material selected from ionomers derived from sodium, lithium or zinc and an ethylene/methacrylic acid copolymer, and a combination thereof, and a light stabilizer; an abrasion and scuff resistant clear first thermoplastic skin layer overlying the first side of the core layer, and a clear second thermoplastic skin layer overlying the second side of the core layer, both skins containing light stabilizer. The composition of the core layer is different from the composition of the skin layers, and the core layer and the skin layers are characterized by the absence of PVC.

29 Claims, 2 Drawing Sheets

U.S. PATENT DOCUMENTS

| | | | | |
|---|---|---|---|---|
| 4,513,028 A | | 4/1985 | Aritake | 427/173 |
| 4,525,134 A | * | 6/1985 | McHenry et al. | 425/130 |
| 4,532,189 A | * | 7/1985 | Mueller | 428/516 |
| 4,542,061 A | * | 9/1985 | Fukushima et al. | 428/220 |
| 4,643,943 A | * | 2/1987 | Schoenberg | 428/339 |
| 4,686,126 A | * | 8/1987 | Hyodo et al. | 428/36.1 |
| 4,713,273 A | | 12/1987 | Freedman | |
| 4,731,214 A | * | 3/1988 | Kondo et al. | 264/514 |
| 4,888,223 A | * | 12/1989 | Sugimoto et al. | 428/34.9 |
| 4,896,943 A | * | 1/1990 | Tolliver et al. | 350/105 |
| 4,946,532 A | * | 8/1990 | Freeman | 156/243 |
| 5,112,423 A | | 5/1992 | Liebe, Jr. | |
| 5,127,974 A | * | 7/1992 | Tomiyama et al. | 156/85 |
| 5,132,380 A | | 7/1992 | Stevens et al. | |
| 5,225,695 A | | 7/1993 | Naka et al. | |
| 5,268,228 A | | 12/1993 | Orr | |
| 5,272,236 A | | 12/1993 | Lai et al. | 526/348.5 |
| 5,321,106 A | | 6/1994 | LaPointe | |
| 5,330,812 A | | 7/1994 | Knoerzer et al. | |
| 5,344,680 A | | 9/1994 | Logan et al. | |
| 5,346,963 A | | 9/1994 | Hughes et al. | 525/285 |
| 5,362,516 A | | 11/1994 | Wilson et al. | |
| 5,372,669 A | | 12/1994 | Freedman | 156/243 |
| 5,421,932 A | * | 6/1995 | Fujio | 156/192 |
| 5,427,807 A | | 6/1995 | Chum et al. | 426/393 |
| 5,435,963 A | * | 7/1995 | Rackovan et al. | 264/509 |
| 5,441,785 A | | 8/1995 | Liebe, Jr. | |
| 5,451,283 A | * | 9/1995 | Josephy et al. | 156/229 |
| 5,453,410 A | | 9/1995 | Kolthammer et al. | |
| 5,460,878 A | * | 10/1995 | Hostetter | 428/349 |
| 5,466,501 A | | 11/1995 | Logan et al. | |
| 5,468,532 A | | 11/1995 | Ho et al. | 428/40 |
| 5,470,993 A | | 11/1995 | Devore et al. | |
| 5,486,632 A | | 1/1996 | Devore et al. | |
| 5,525,695 A | | 6/1996 | Lai et al. | 526/352 |
| 5,539,068 A | | 7/1996 | Devore et al. | |
| 5,585,193 A | | 12/1996 | Josephy et al. | |
| 5,618,600 A | | 4/1997 | Denklau | |
| 5,702,790 A | | 12/1997 | Liebe, Jr. | |
| 5,716,698 A | * | 2/1998 | Schreck et al. | 428/323 |
| 5,721,086 A | | 2/1998 | Emslander et al. | 430/126 |
| 5,754,269 A | * | 5/1998 | Benjamin et al. | 351/159 |
| 5,928,827 A | | 7/1999 | Rajan | |

FOREIGN PATENT DOCUMENTS

| | | | | |
|---|---|---|---|---|
| EP | 536 852 | B1 | 4/1993 | |
| EP | 569878 | A2 * | 11/1993 | B32B/27/18 |
| FR | 2 580 543 | | 10/1986 | |
| GB | 2 301 693 | | 12/1996 | |
| JP | 05208447 | A * | 8/1993 | B29C/61/06 |
| JP | 05305667 | A * | 11/1993 | B29C/61/06 |
| WO | 9308221 | | 4/1993 | |
| WO | 9313143 | | 7/1993 | |
| WO | 9500526 | | 1/1995 | |
| WO | 9621557 | | 7/1996 | |
| WO | WO97/18276 | | 5/1997 | |
| WO | WO97/18295 | | 5/1997 | |
| WO | 9855296 | | 10/1998 | |

OTHER PUBLICATIONS

Avery Dennison Marking Films, "Product Selection Guide", Apr. 1995.

GSP Graphix 4 User's Manual.

Roland Digital Group; Graphic Precision; CAMM–1 Desktop Signmakers; 1997.

Roland Digital Group; CAMM–1; PNC–960, PNC–910 User's Manual; pp. 1–25.

Roland Digital Group, User's Manual for Desktop Signmaker, CAMM–1 (PNC–950).

PCT International Search Report PCT/US 99/12948 Sep. 6, 1999.

* cited by examiner

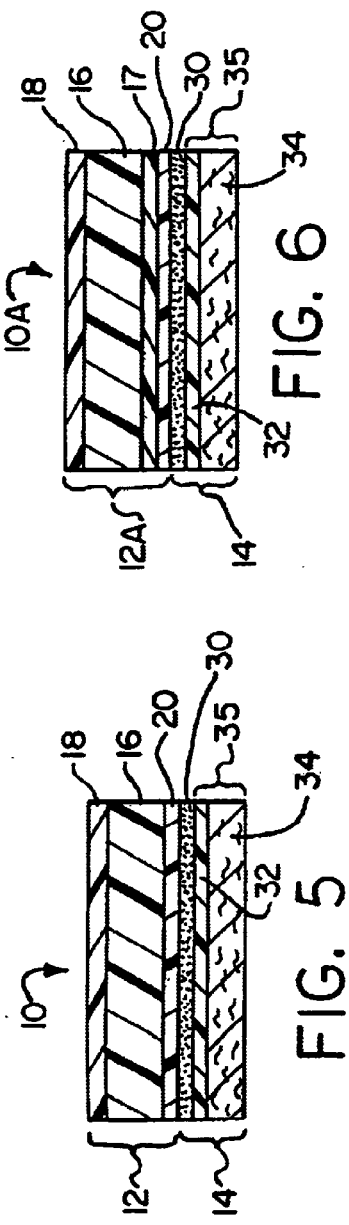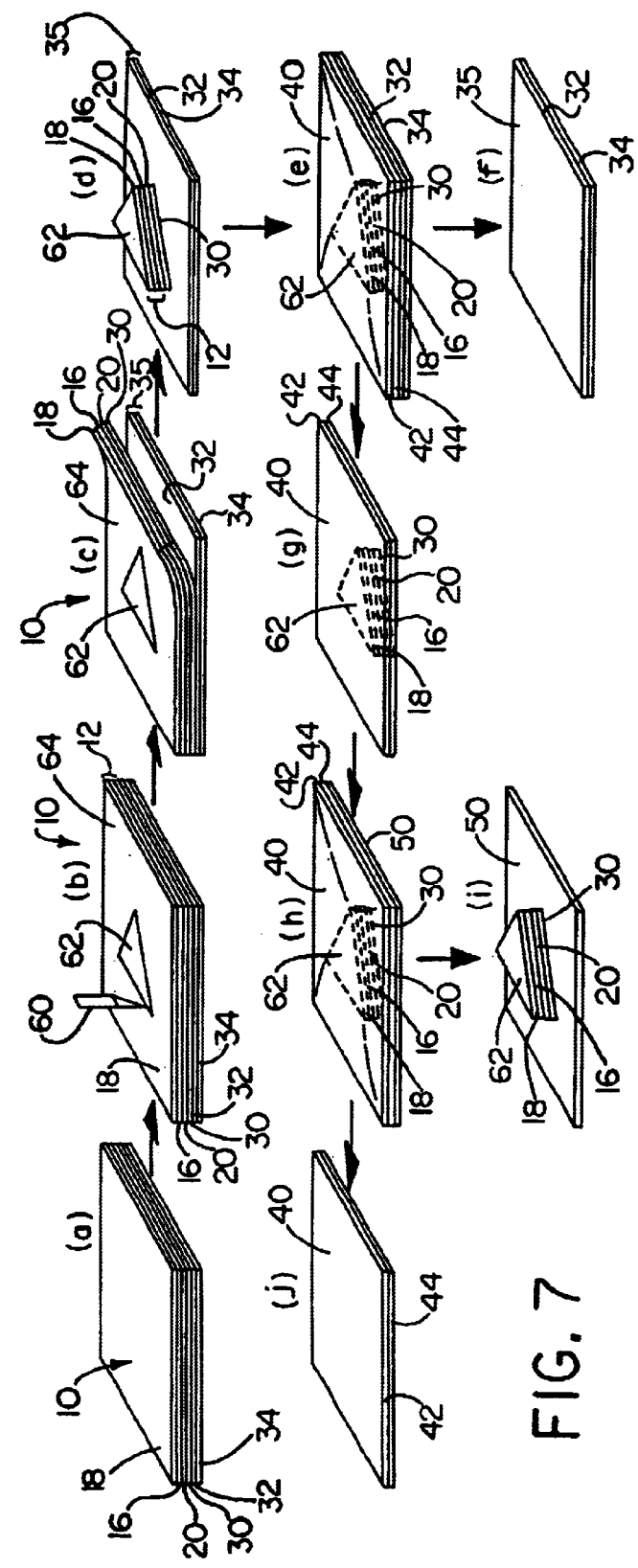

MULTILAYERED THERMOPLASTIC FILM AND SIGN CUTTING METHOD USING THE SAME

This application is a continuation-in-part of U.S. patent application Ser. No. 09/096,984, filed Jun. 12, 1998.

TECHNICAL FIELD

This invention relates to a multilayered thermoplastic film, useful as signage films, and to a sign cutting method using the foregoing multilayered film.

BACKGROUND OF THE INVENTION

Sign cutting methods wherein an image is cut from a polymer film adhered to a pressure sensitive adhesive composite and then transferred to a desired substrate are known. This technique is used to provide a wide variety of signage applications including exterior identification signs as well as decorative or commercial graphics on trucks, cars, boats, and the like. The polymer film that is typically used with these graphic applications is a calendered or dispersion cast polyvinyl chloride (PVC) monolayer film. While the use of these PVC films have met with success in the marketplace, they have also been found to be not entirely acceptable. Neither the PVC films nor the processes for making such films are environmentally friendly. Many of the PVC films employ plasticizers that migrate into the adhesive and degrade the functionality of the adhesive composite. Plasticizer migration is also considered to be related to objectionable spotty film appearance, sometimes referred to as mottle. This problem is especially troublesome in warm weather climates. Many of the processes for making the PVC films are costly. The present invention, which relates to a novel multilayered film structure and to a sign cutting method using the same, overcomes these problems.

U.S. Pat. No. 4,946,532 discloses composite facestocks and liners made of multilayer polymeric films. The multilayer film is comprised of a coextrudate containing a core or base layer and skin layers overlying each side of the core layer. The core layer contains a filler material.

U.S. Pat. No. 5,435,963 discloses an oriented polymeric in-mold label film that includes a hot-stretched, annealed, linerless self-wound film lamina. The film is disclosed as having a face layer for printing, a central layer, and a base layer which includes a heat-activatable adhesive. The working examples disclose a label film with the face layer disclosed as being a mixture of an ethylene/vinyl acetate copolymer and a polypropylene homopolymer. The central layer is disclosed as being a mixture of an ethylene/vinyl acetate copolymer, either polypropylene homopolymer or a random polypropylene copolymer, and optionally a titanium dioxide concentrate. The base layer is disclosed as being a mixture of an ethylene/vinyl acetate copolymer, either a polypropylene homopolymer or a low density polyethylene, and optionally a heat-activatable adhesive and an antistat.

SUMMARY OF THE INVENTION

This invention relates to a multilayer film, comprising: at least one polyolefin core layer having a first side and a second side, at least one abrasion resistant first thermoplastic skin layer overlying the first side of the core layer, and at least one second thermoplastic skin layer overlying the second side of the core layer; wherein the composition of the core layer is different than the composition of the skin layers, and the core layer and the skin layers are characterized by the absence of PVC.

In one aspect, the invention relates to a multilayered thermoplastic film, comprising: a thermoplastic core layer having a first side and a second side, the core layer comprising: a polyolefin having a density in the range of about 0.89 to about 0.97 grams per cubic centimeter; and a light stabilizer; at least one abrasion and scuff resistant clear first thermoplastic skin layer on one first side of the core layer, the at least one first skin layer comprising a light stabilizer; and at least one second thermoplastic skin layer on an opposed second side of the core layer, the at least one second skin layer comprising a light stabilizer; the composition of the core layer being different than the composition of the skin layers, the core layer and the skin layers being characterized by the absence of polyvinyl chloride (PVC).

One preferred embodiment of this invention relates to a multilayered thermoplastic film having a blended core composition, comprising: a thermoplastic core layer comprising: a polyolefin having a density in the range of about 0.89 to about 0.97 grams per cubic centimeter and a second polymeric material selected from the group consisting of ethylene-acrylic acid copolymers, ethylene-methacrylic acid copolymers, ionomers derived from sodium, lithium or zinc and an ethylene/methacrylic acid copolymer, and a combination thereof, and a light stabilizer at a concentration of about 1,000 to about 10,000 ppm based on the weight of the core layer.

The invention also relates to a sign cutting method, comprising: providing a pressure sensitive adhesive composite, the composite comprising the foregoing multilayered thermoplastic film, a layer of a pressure sensitive adhesive and a release liner; cutting an image in the multilayered thermoplastic film; and transferring the image to a substrate.

BRIEF DESCRIPTION OF THE DRAWINGS

In the annexed drawings, like references indicate like parts or features:

FIG. 5 is a schematic illustration of the side view of a pressure sensitive adhesive composite embodying the present invention in a particular form, the composite comprising a thermoplastic core layer having a first side and a second side, an abrasion resistant first thermoplastic skin layer overlying the first side of the core layer, a second thermoplastic skin layer overlying the second side of the core layer, a layer of a pressure sensitive adhesive overlying the second skin layer, a layer of a release coating overlying the pressure sensitive adhesive, and a backing liner overlying the release coating layer.

FIG. 6 is a schematic illustration of the side view of a pressure sensitive adhesive composite embodying the present invention in another particular form, the composite comprising a thermoplastic core layer having a first side and a second side, an abrasion resistant first thermoplastic skin layer overlying the first side of the core layer, an intermediate layer overlying the second side of the core layer, a second thermoplastic skin layer overlying the intermediate layer, a layer of a pressure sensitive adhesive overlying the second skin layer, a layer of a release coating overlying the pressure sensitive adhesive, and a backing liner overlying the release coating layer.

FIG. 7 is a flow sheet illustrating the inventive sign cutting method in a particular form.

DESCRIPTION OF THE PREFERRED EMBODIMENTS

Figure 1:
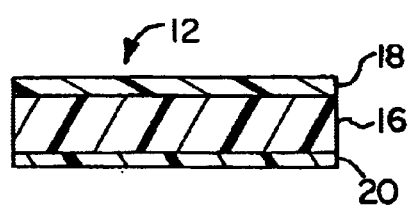
FIG. 1 is a schematic illustration of the side view of a multilayered thermoplastic film embodying the present invention in a particular form, the film comprising a thermoplastic core layer having a first side and second side, an abrasion resistant first thermoplastic skin layer overlying the first side of the core layer, and a second thermoplastic skin layer overlying the second side of the core layer.

As described above, the present invention relates to signage films and multilayer thermoplastic films. The films are characterized as having a core layer which is composed of at least one polyolefin. In another embodiment, the core further comprises one or more of a light stabilizer, a pigment, one or more other thermoplastic polymers or processing additives, the details of which are discussed below. The films of the present invention also include at least one skin layer on the core. The skin layers may be directly in contact with the core or may be attached to the core through tie or intermediate layers. At least one skin layer is abrasive resistant. In one aspect, the abrasive resistant layer is the first skin layer and may be clear or pigmented, preferably clear. This layer may be prepared from blends of polymers and include one or more of light stabilizers, pigments or processing chemicals, the details of which are described herein. The second skin may be clear or pigmented. The second skin may be prepared from a blend of polymers and may also include one of more of light stabilizers, processing chemicals or pigments, which are described herein. The multilayer film may be oriented or unoriented, preferably unoriented. The skin and core may be independently oriented or unoriented, preferably unoriented. The materials used to make the films of the present invention, in one embodiment, are selected to provide the physical characteristics necessary for signage. In other words, the materials must provide effective physical characteristics to provide the needed strength to withstand the cutting process and weatherability for sign applications.

In a preferred embodiment, the inventive multilayered films are characterized by a combination of features. These include the composition of the core layer being characterized by the combination of a polyolefin having a density in the range of about 0.89 to about 0.97 grams per cubic centimeter, and in a most preferred embodiment, a second thermoplastic polymeric material selected from ethylene-unsaturated carboxylic acid or anhydride, such as ethylene-acrylic acid copolymers, ethylene-methacrylic acid copolymers, and ionomers derived from sodium, lithium or zinc and an ethylene/unsaturated acid or anhydride, such as an ethylene/methacrylic acid copolymer, and combinations thereof, the concentration of the second thermoplastic polymeric material being from about 1% to about 25% preferably from about 2% to about 10% by weight based on the weight of the core layer. Unexpectedly, this combination of polyolefin and a second polymeric material significantly improves the appearance of the film. This combination is particularly advantageous when dark colors (e.g., dark blue, black, etc.) are desired. For example, in one embodiment, a film with a charcoal gray appearance is produced when only the polyolefin is used, but when the polyolefin is combined with the second polymeric material as indicated above, a deep black color is achieved. It is recognized that the polymer blend is useful in some applications where color is important to the end-user, there are some applications where this is not the case, and the composition of the core need not be a copolymer blend.

In one embodiment, the core layer and each of the skin layers are characterized by relatively high concentrations of light stabilizers. In this regard, the core layer has a light stabilizer concentration of about 1,000 to about 10,000 ppm or from about 2500 to about 8000, the first skin layer has a light stabilizer concentration of about 2,000 to about 20,000 ppm or from about 5000 to about 16,000, and the second skin layer has a light stabilizer concentration of about 1,000 to 15,000, from about 3,000 to about 12,000 ppm. The use of such high levels of light stabilizers provides the inventive multilayered films with outdoor weatherability properties comparable to and in some instances superior to those of the PVC films used in the prior art.

In a most preferred embodiment, there is at least one skin layer and that layer is clear. More typically however, there are generally two skin layers. This enhances the economics of using the inventive multilayered film when the core layer is pigmented due to the fact that the time involved with changing from one color to another during extrusion of the multilayered film is significantly reduced. While not wishing to be bound by theory, it is believed that this advantage is realized because pigment in extruded polymer compositions tends to adhere to the internal metal parts of the extruder die and other extrusion apparatus downstream of the extruder, and the use of the clear skin layers of the invention prevents or limits contact between the pigmented core layer and the internal metal parts of the foregoing extrusion equipment.

The first skin layer and, optionally, the second skin layer, of the inventive multilayered film is characterized by the use of an abrasion and scuff resistant polymer. This feature not only provides the inventive multilayered film with enhanced abrasion and scuff resistance properties, but also provides the film with excellent sign cutting and weeding properties.

The inventive multilayered film is characterized by the absence of PVC. The overall composition of the core layer is different than the overall composition of the skin layers.

The inventors have found that the foregoing combination of features provides the inventive multilayered films with properties that make them equivalent to or superior to the PVC films used in the prior art, and yet allows for the use of films that avoid the problems involved with the use of such PVC films.

Figure 2:
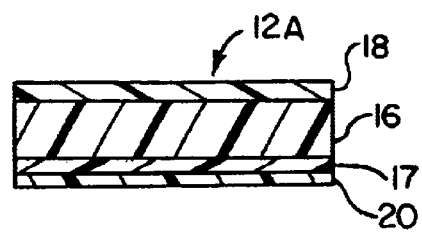
FIG. 2 is a schematic illustration of the side view of a multilayered thermoplastic film embodying the present invention in another particular form, the film comprising a thermoplastic core layer having a first side and a second side, an abrasion resistant first thermoplastic skin layer overlying the first side of core layer, an intermediate layer overlying the second side of the core layer, and a second thermoplastic skin layer overlying the intermediate layer.

Useful embodiments of the inventive multilayered film are depicted in FIGS. 1 and 2. Referring to FIG. 1, multilayered film 12 has a thermoplastic core layer 16, which has a first side and a second side, an abrasion and scuff resistant clear first thermoplastic skin layer 18 overlying the first side of the core layer 16, and a clear second thermoplastic skin layer 20 overlying the second side of the core layer 16. Skins 18 and 20 may also be pigmented.

Referring to FIG. 2, multilayered film 12A has a thermoplastic core layer 16, which has a first side and a second side, an intermediate layer 17 overlying to the second side of the core layer 16, an abrasion and scuff resistant clear first thermoplastic skin layer 18 overlying the first side of the core layer 16, and a clear second thermoplastic skin layer 20 overlying the intermediate layer 17. Skins 18 and 20 may also be pigmented. The intermediate layer may be a stiffening layer. The stiffening layer is composed of a thermoplastic polymer, such as the polyolefins described herein (e.g. polyethylene, polypropylene, or an ethylene, propylene copolymer). The intermediate layer may be an adhesive layer as well. The intermediate layer may be composed of reground core polymers which include pigments. As an alternative, the intermediate layer may also be an opacifying layer. The opacifying layer contains materials which increase the opacity of the multilayer film.

The core layer 16 is comprised of at least one thermoplastic polymer, which are discussed below. The core layer may be composed of a single thermoplastic polymer or a blend a thermoplastic polymer with either a second thermoplastic polymer or an adhesive. The core may also be composed of a thermoplastic polymer, a second thermoplastic polymer and an adhesive. Of course it is understood that the core may have other processing components and stabilizing components as is discussed below.

In one embodiment, the core layer 16 is comprised of a combination of thermoplastic polymers. This combination is comprised of: a polyolefin having a density in the range of about 0.89 to about 0.97 g/cc, and in one embodiment about 0.915 to about 0.97 g/cc, and in one embodiment about 0.926 to about 0.945 g/cc. In a preferred embodiment of the invention, the core includes a second thermoplastic polymeric material selected from ethylene-unsaturated carboxylic acid or anhydride such as ethylene-acrylic acid copolymers, or ethylene-methacrylic acid copolymers, ionomers derived from sodium, lithium or zinc and ethylene-unsaturated carboxylic acid or anhydride such as ethylene/methacrylic acid copolymers, and combinations of two or more thereof. The concentration of the second thermoplastic polymeric material is critical and is in the range of about 2% to about 25% by weight based on the weight of the core layer 16. In one embodiment, the concentration of the second thermoplastic polymer is from about 2% to about 22% by weight, and in one embodiment about 3% to about 20% by weight, and in one embodiment about 3% to about 10% by weight based on the weight of the core layer 16. The combined weight of the polyolefin and second thermoplastic polymeric material is at least about 60% by weight based on the weight of the core layer 16, and in one embodiment about 60% to about 95% by weight, and in one embodiment about 70% to about 95% by weight based on the weight of the core layer 16.

The polyolefins that are useful in the core include polyethylene, polypropylene or polybutylene or copolymers of ethylene, propylene or butylene with an alpha olefin. The alpha olefin, is selected from those alpha olefins containing from 3 to about 18 carbon atoms, and in one embodiment 2 to about 12 carbon atoms, and in one embodiment, 3 to about 8 carbon atoms, including propylene, ethylene, butene, butylene, hexene, 4-methylpentene and octene. The polyolefin core may be made by a blend of polyolefins such as a polyethylene and an ethylene propylene copolymer. Medium density polyethylenes and the linear medium density polyethylenes are useful. Useful polyolefins include those prepared using a Ziegler-Natta catalyst or a metallocene catalyst. An example of a useful polyolefin is available from Huntsman Products under the trade designation 1080, which is identified as a polyethylene having a density of 0.93 g/cc. Affinity 1030HF, which is a product of Dow Chemical identified as a metallocene catalyst catalyzed octene-ethylene copolymer can also be used. Dowlex 2036A which is a product of Dow identified as linear medium density polyethylene can be used. Quantum 285-003, which is a product of Millenium Petrochemical identified as a polyethylene resin having a density of 0.93 grams per cubic centimeter can be used.

As described above, the core layer may include a second thermoplastic material selected from ethylene-unsaturated carboxylic acid or anhydride copolymers, ionomers derived from sodium, lithium or zinc and ethylene/unsaturated carboxylic acid or anhydride copolymers, and combinations of two or more thereof. The ionomer resins available from DuPont under the tradename Surlyn can be used. These resins are identified as being derived from sodium, lithium or zinc and copolymers of ethylene and methacrylic acid. Included in this group are: the sodium containing ionomers available under the Surlyn name and the following designations: 1601, 1605, 1707, 1802, 1901, AD-8548, 8020, 8140, 8528, 8550, 8660, 8920 and 8940. Also included are the zinc containing ionomers available under the Surlyn name and following designations: 1650, 1652, 1702, 1705-1, 1855, 1857, AD-8547, 9120, 9650, 9730, 9910, 9950 and 9970. The lithium containing ionomers available under the Surlyn name and the following designations are also useful: AD-8546, 7930 and 7940.

The ethylene/methacrylic acid copolymers that are useful include those available from DuPont under the tradename Nucrel. These include Nucrel 0407, which has a methacrylic acid content of 4% by weight and a melting point of 109° C., and Nucrel 0910, which has a methacrylic acid content of 8.7% by weight and a melting point of 100° C.

The ethylene/acrylic acid copolymers that are useful include those available from Dow Chemical under the tradename Primacor. These include Primacor 1430, which has an acrylic acid monomer content of 9.5% by weight and a melting point of 97° C.

The core layer 16 can be pigmented or it can be clear. A clear core layer is one that can be seen through. Preferably, the core layer is pigmented. The pigment can be a metallic pigment, heavy metal-based pigment, a heavy-metal free pigment, or an organic pigment. A heavy metal is defined herein as being lead, cadmium, chromium, or antimony. The pigments that can be used include titanium dioxide, both rutile and anatase crystal structure. The titanium dioxide may be coated or uncoated (e.g. aluminum oxide coated $TiO_2$).

In one embodiment, the pigment is added to the core layer material in the form of a concentrate containing the pigment and a resin carrier. The concentrate may contain, for example, about 20% to about 80% by weight pigment, and about 20% to about 80% by weight resin carrier. The resin carrier can be any thermoplastic polymer having a melting point in the range of about 100° C. to about 175° C. Examples include polyethylene, polypropylene, polybutylene, and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename Polybatch White P8555 SD, which is identified as a white color concentrate having a coated rutile titanium dioxide concentration of 50% by weight in a polypropylene homopolymer carrier resin. Ampacet 150380, which is a product of Ampacet Corporation identified as a red pigment concentrate, can be used. Ampacet 190303, which is a product of Ampacet Corporation identified as a black pigment concentrate, can be used. Ampacet LR-87132 Orange PE MB, which is a product of Ampacet Corporation identified as a lead molybdate/lead chromate pigment concentrate, can be used. The heavy-metal free pigment concentrates that can be used include Ampacet LR-86813 Yellow UV PE MB, Ampacet LR-86810 Red PE MB, Ampacet LR-86816 Orange PE MB, and Ampacet LR-86789 Red UV PE MB. The concentration of pigment in the core layer can be up to about 25% by weight, and in one embodiment about 5% to about 25% by weight, and in one embodiment about 10% to about 20% by weight.

As indicated above, the multilayered film 12 or 12A is useful in sign applications and a critical feature of this invention is that the skin layer 18 be abrasion and scuff resistant. Also, in one embodiment, the skin layer 20 is abrasion and scuff resistant. The type of abrading and scuffing that is of concern is the abrading and scuffing that occurs when the film is applied to a substrate. In one embodiment of the invention, the film is applied with a rubber or plastic applicator which is rubbed against the film surface to smooth out the edges or remove air bubbles trapped between the film and substrate. The air is squeezed out from underneath the film by forcing the bubble of air to the edge. This tends to abrade and/or scuff the film surface leaving an objectionable appearance. Abrasion and scuff resistance can be measured using ASTM D4060-84. For purposes of this invention, a film surface that is "abrasion and scuff resistant" is a film surface that has a 60° gloss reduction of 20 points or less when tested in accordance with ASTM D4060-84 using a No. CS-10 wheel and a 250 gram load after 5 cycles of rotation.

The skin layer 18 may be clear or pigmented, preferably clear. The term "clear" is used herein to refer to the fact that the skin layer 18 can be seen through. "Clear" films are those through which graphics may be read. These include matte and transparent films. When pigmented, the skin layer may contain one or more of the pigments described herein. The skin layer 18 is comprised of any thermoplastic polymer abrasion and scuff resistant as indicated above. In one embodiment, the skin layer is comprised of an ethylene-acrylic acid copolymer, ethylene-methacrylic acid copolymer, an ionomer derived from sodium, lithium or zinc and an ethylene/methacrylic acid copolymer, or a combination thereof. Any of the ethylene acrylic or methacrylic acid copolymers or ionomers described above as being useful in making the core layer 16 can be used. These copolymers and ionomers that are useful include the ionomers available from DuPont under the tradename Surlyn, the ethylene/methacrylic acid copolymers available form DuPont under the tradename Nucrel, and the ethylene/acrylic acid copolymers available from Dow Chemical under the tradename Primacor. The concentration of the foregoing thermoplastic polymers in the skin layer 18 is generally at least about 45%, or at least about 60% by weight, based on the overall weight of the skin layer 18, and in one embodiment at least about 75% by weight, and in one embodiment about 75% to about 98% by weight, and in one embodiment about 80% to about 95% by weight. The skin layer may also include one or more of the above described polyolefins such as polyethylene, polypropylene, or an ethylene-propylene copolymer. Typically, the polyolefin is present in a minor amount such as an amount from about 3% to about 40%, or from about 5% to about 25%.

The skin layer 20 is clear or pigmented and may be comprised of any of the thermoplastic polymers discussed above as being useful in making the core layer 16 or skin layer 18. The term "clear" is used herein to refer to the fact that the skin layer 20 can be seen through. When pigmented, the skin layer may contain one or more of the above pigments described herein. In one embodiment, the skin layer 20 is abrasion and scuff resistant. The skin layer 20 may be comprised of a thermoplastic copolymer or terpolymer derived from ethylene or propylene and a functional monomer selected from the group consisting of acrylic acid, alkyl acrylic acid, and combinations of two or more thereof. The alkyl groups in the alkyl acrylic acids typically contain 1 to about 8 carbon atoms, and in one embodiment 1 to about 2 carbon atoms. The functional monomer(s) component of the copolymer or terpolymer ranges from about 1 to about 15 mole percent, and in one embodiment about 1 to 10 mole percent of the copolymer or terpolymer molecule. Examples include: ethylene/methacrylic acid copolymers; ethylene/acrylic acid copolymers; ethylene/methacrylic acid copolymers containing sodium, lithium or zinc (also referred to as ionomers); and mixtures of two or more thereof. The composition of the skin layers 18 and 20 can be the same as each other or they can be different. The concentration of the foregoing thermoplastic polymers in the skin layer 20 is generally at least about 50% by weight, and in one embodiment at least about 60% by weight, and in one embodiment about 60% to about 97% by weight, and in one embodiment about 70% to about 95% by weight. The skin layer may also include one or more of the above described polyolefins such as polyethylene, polypropylene, or an ethylene-propylene copolymer. Typically, the polyolefin is present in a minor amount such as an amount from about 3% to about 40%, or from about 5% to about 25%.

In another embodiment, skin layer 20 is an adhesive skin layer. The adhesive skin layer comprises adhesive polymers such those described below and including ethylene vinyl acetate copolymers. The skin layer 20 may also be a blend of an adhesive polymer and a polyolefin or one of the second thermoplastic polymers described above. In one embodiment, the adhesive skin layer includes a blend of polyolefin and an adhesive polymer. The polyolefin is typically present in an amount from about 50% up to about 95%, or from about 65% up to about 85% by weight. The adhesive polymer is present in an amount from about 5% up to about 45%, or from about 15% to about 35% by weight.

The core layer 16 and skin layers 18 and 20 may contain relatively high concentrations of light stabilizers such as ultraviolet (UV) light absorbers and/or other light stabilizers. These additives are included to provide the inventive films with enhanced outdoor weatherability properties. The concentration of these light stabilizers in the core layer 16 is in the range of about 1,000 to about 10,000 ppm based on the weight of core layer 16, and in one embodiment from about 2,000 to about 10,000 ppm, and in one embodiment about 3,000 to about 8,000 ppm. The concentration of light stabilizer in the skin layer 18 is in the range of about 2,000 to about 20,000 ppm based on the weight of skin layer 18, and in one embodiment from about 5,000 to about 20,000 ppm, and in one embodiment from about 8,000 to about 18,000 ppm. The concentration of the light stabilizer in the second skin layer 20 is in the range of about 1,000 to about 15,000 ppm based on the weight of the skin layer 20, and in one embodiment about 3,000 to about 15,000 ppm, and in one embodiment about 5,000 to about 12,000 ppm.

Useful light stabilizers include the hindered amine light stabilizers. Hindered amine light stabilizers are described in the literature such as in U.S. Pat. No. 4,721,531, columns 4 to 9, which is incorporated herein by reference. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designations "Tinuvin" and "Chemissorb", and from Cytec under the general designation "Cyasorb-UV." Examples include Tinuvin 783 which is identified as a mixture of poly [[60 [(1,1,3,3,-tetramethyl butyl)amino]-1,3,5-triazine-2,4-diyl] [[2,2,6,6-tetramethyl-4-piperidyl)imino]hexamethylene[(2, 2,6,6-tetramethyl-4-piperidyl) imino]] and dimethyl succinate polymer with 4-hydroxy-2,2,6,6-tetramethyl-1-piperidineethanol; Tinuvin 770 which is identified as bis-(2, 2,6,6-tetramethyl-4-piperidinyl)-sebacate; Tinuvin 765 which is identified as bis-(1,2,2,6,6-pentamethyl-4-piperidinyl)-sebacate; Tinuvin 622 which is a polyester of succinic acid and N-beta-hydroxy ethyl-2,2,6,6-tetramethyl-4-hydroxy-piperidine; and Chemissorb 944 which is poly [6-(1,1,3,3-tetramethylbutyl)amino]-s-triazine-2,4-diy[[2,2, 6,6-tetramethyl-4-piperidyl)imino]hexamethylene (2,2,6,6-tetramethyl-4-piperidyl)imino]. A useful stabilizer is available under the tradename Ampacet 10561 which is a product of Ampacet identified as a UV stabilizer concentrate containing 20% by weight of a UV stabilizer and 80% by weight of a low density polyethylene carrier resin; the UV stabilizer in this product is Chemissorb 944. Useful light stabilizers are also provided in Ampacet 150380 and Ampacet 190303, both of which are pigment concentrates discussed above. Ampacet 150380 has a UV stabilizer concentration of 7.5% by weight. Ampacet 190303 has a UV stabilizer concentration of 4% by weight. The UV stabilizer in each of these products is Chemissorb 944. Ampacet LR-89933 is a grey concentrate having a UV stabilizer concentration of 4.5% by weight, the UV stabilizer being Tinuvin 783.

The skin layers 18 and 20 may contain antiblock and/or slip additives. These additives reduce the tendency of the film to stick together when it is in roll form. The antiblock additives include natural silica, diatomaceous earth, synthetic silica, glass spheres, ceramic particles, etc. The slip additives include primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bisamides such as N,N'-ethylenebisstearamide, N,N'-ethylenebisolamide and the like; and combinations of any two or more of the foregoing amides. An example of a useful slip additive is available from Ampacet under the trade designation 10061; this product is identified as a concentrate containing 6% by weight of a stearamide slip additive. The antiblock and slip additives may be added together in the form of a resin concentrate. An example of such a concentrate is available from DuPont under the tradename Elvax CE9619-1. This resin concentrate contains 20% by weight silica, 7% by weight of an amide slip additive, and 73% by weight of Elvax 3170 (a product of DuPont identified as an ethylene/vinyl acetate copolymer having a vinyl acetate content of 18% by weight). The antiblock additive can be used at a concentration in the range of up to about 1% by weight, and in one embodiment about 0.01% to about 0.5% by weight. The slip additive can be used at a concentration in the range of up to about 1% by weight, and in one embodiment about 0.01% to about 0.5% by weight.

Another use for slip additives is to impart scuff resistance to the top skin layer (18) surface. Depending upon how these materials are incorporated in skin layer 18 these materials will migrate to the surface through incorporation in the body of layer 18 or can be applied to the top. The slip can be incorporated in skin layer 18 by polyethyelene concentrate form or by direct feeding of these additves through ports in the skin extruder.

The core layer 16 may contain a minor amount of an adhesive resin to enhance the adhesion of the skin layers 18 and 20 to the core layer 16. Also, or alternatively, tie layers of an adhesive resin can be positioned between the core layer 16 and either or both of the skin layers 18 and 20 for enhancing adhesion. The adhesive resin can be an ethylene/vinyl acetate copolymer. These include the ethylene/vinyl acetate copolymers available from DuPont under the trade designation Elvax. Examples include Elvax 3170 and 3190LG. The adhesive resins available from DuPont under the tradename Bynel can also be used. These include ethylene/vinyl acetate resins available under the trade designation Series 1100, acid-modified ethylene acrylate polymers (Series 2000), anhydride-modified ethylene acrylate copolymers (Series 2100), anhydride-modified ethylene/vinyl acetate copolymers (Series 3000), acid- and acrylate-modified ethylene/vinyl acetate resins (Series 3100), anhydride-modified ethylene/vinyl acetate copolymers (Series 3800), anhydride-modified ethylene/vinyl acetate resins (Series 3900), anhydride-modified high density polyethylene resins (Series 4000), anhydride-modified linear low density polyethylene resins (Series 4100), anhydride modified low density polyethylene resins (Series 4200), and anhydride modified polypropylene resins (Series 5000). Bynel CXA 1123 and Bynel CXA 3101 are specific examples. When included in the core layer, the adhesive resin is used at a concentration of up to about 45%, or up to about 25% by weight, and in one embodiment about 1% to about 15% by weight. In another embodiment, the adhesive resin is present in an amount from about 20% to about 40%, or from about 25% to about 35% by weight. When used in the form of film layers between the core layer and the skin layers, each of such adhesive resin film layers has a thickness of about 5% to about 25% of the thickness of the multilayer film, and in one embodiment about 10% to about 20%. In one embodiment, the adhesive layer has a thickness of about 0.1 to about 0.5, or from about 0.2 to about 0.4 mil.

In one embodiment, the core layer 16 and/or skin layers 18 and 20 contain an effective amount of a processing aid to facilitate extrusion. While not wishing to be bound by theory, it is believed that these processing aids have a high affinity to metal surfaces and thereby prevent or reduce the tendency of the polymer compositions being extruded from adhering to the inner walls of the extrusion equipment. This makes it easier to purge the extrusion equipment during color changeovers. These processing aids include hexafluorocarbon polymers. An example of a commercially available processing aid that can be used is Ampacet 10919 which is a product of Ampacet Corporation identified as a hexafluoro carbon polymer. The processing aids are typically used at concentrations of up to about 0.25% by weight, and in one embodiment about 0.03% to about 0.15% by weight.

As indicated above, one embodiment of the invention (FIG. 2) involves providing a intermediate layer 17 between the core layer 16 and the skin layer 20. The intermediate layer 17 may be comprised of the same materials as the core layer 16, skin layer 18 and/or skin layer 20. In one embodiment, scrap or trim material produced during the process for making these multilayered films can be recycled as the intermediate layer material. An example of a polyolefin that can be used in the intermediate layer is the polyethylene resin supplied by Huntsman under the trade designation 1080. In one embodiment, the intermediate layer 17 is pigmented so as to be white, black or gray in color. That is, the pigments used in this intermediate layer 17 are white, black, or a suitable mixture of white and black to provide a desired shade of gray. In this embodiment, the core layer 16 may contain a colored pigment (e.g., red, blue, yellow, etc). This combination enhances the opacity of the inventive multilayered film and provides the film with deeper and richer colors. With this embodiment, it is of particular advantage to use heavy-metal free pigments in both the core layer and the intermediate layer. Examples of commercially available heavy-metal free pigments or organic pigments that can be used include Ampacet LR-86789 which is a red pigmented polyethylene resin concentrate, Ampacet 190303 which is a black pigmented polyethylene resin concentrate, Ampacet LR-89933 which is a grey concentrate, and Ampacet 110235 which is a white pigmented polyethylene concentrate. The intermediate layer 17, when used, typically has a thickness of about 5% to about 25%, and in one embodiment about 10% to about 15% of the overall thickness of the multilayered film 12A.

In one embodiment, a clear topcoat layer overlies skin layer 18. A topcoat layer may be added to any of the multilayer films described herein. The topcoat layer is applied to the first skin layer and may directly applied or attached through one or more tie or adhesive (such as the pressure sensitive adhesive described herein) coats. The topcoat layer is used to provide the inventive multilayered film with enhanced abrasion and scuff resistant properties and, in one embodiment, enhanced gloss characteristics. The topcoat preferably has a thickness from about 2 to about 6,or from about 3 to about 5 microns. The topcoat layer is made from a thermoplastic polymer composition, the polymer being an ester, urethane, epoxy, phenoxy, acrylic, or a combination of two or more thereof. The polymer can be a radiation curable polymer, with UV curable epoxy, acrylic, ester, urethane and phenoxy resins being especially useful. The polymer can be a heat curable resin with urethane and acrylic resins being especially useful. The polymer composition may contain diluents (e.g., vinyl ether, limonene dioxide, epoxy oligomers, glycidyl ether), wetting agents or surfactants which are used to provide a uniform flow resulting in an even topcoating layer, waxes, slip aids, light stabilizers, and the like. Use of at least one of the foregoing light stabilizers discussed above is critical and any of the light stabilizers discussed above can be used. The concentration of these light stabilizers is in the range of about 500 about 20,000 ppm, and in one embodiment about 1,000 to about 12,000 ppm, and in one embodiment about 2,000 to about 8,000 ppm. The thickness of the topcoat layer is generally from about 1 to about 12 microns, and in one embodiment from about 3 to about 6 microns. An example of an acrylic resin based topcoat formulation that can be used is as follows:

| Tradename | Supplier | Description | Weight % |
|---|---|---|---|
| Rhoplex B15P | Rohm & Haas | Acrylic Resin | 93.9% |
| CX 100 | Zeneca Resins | Polyaziridine Crosslinker | 3.0% |
| Disperbyk 182 | Byk Chemie | Wetting Agent | 1.0% |
| DF-75 | Air Products | Defoamer | 0.1% |
| Synflow 178XF | Micro Powders | Wax/Mar Additive | 2.0% |

An example of an UV curable epoxy resin based topcoat formulation that can be used is as follows:

| Tradename | Supplier | Description | Weight % |
|---|---|---|---|
| Cyracure UVR-6110 | Union Carbide | Epoxy Resin | 83.5% |
| Tone 301 | Union Carbide | Caprolactone Polyol | 10.0% |
| Cyracrure UVI-6974 | Union Carbide | Photoinitiator | 6.0% |
| Silivet L7604 | OSI | Wetting Agent | 0.5% |

An example a UV curable urethane based topcoat formulation is as follows:

| Tradename | Supplier | Description | Weight % |
|---|---|---|---|
| CN 963B80 | Sartomer | urethane acrylate (aliphatic) | 75% |
| SR 238 | Sartomer | 1,6 hexanediol | 20.5% |
| Irgacure 184 | Ciba | photoinitiator | 3% |
| Tinuvin 1130 | Ciba | UV Stabilizer | 1% |
| Tinuvin 123 | Ciba | UV Stabilizer | 0.5% |

In one embodiment, the topcoat provides the ability to print by any method, such as with electrostatic and thermal transfer printing. The topcoat may be any of the topcoats described herein. Preferably the topcoat is a thermal plastic polyurethane. The printing topcoat is preferably applied at a coat weight of about 5 to about 9, or from about 6 to about 8 gsm. An example of a topcoat for printing is as follows:

| Tradename | Supplier | Description | Weight % |
|---|---|---|---|
| Irostic 9827 | Morton Chemical | thermoplastic polyurethane | 12% |
| — | — | Methyl, Ethyl Ketone | 38% |
| Irganox 1010 | Ciba | Antioxidant | 0.25% |
| Tinuvin 292 | Ciba | UV Stabilizer | 0.125% |
| Tinuvin 328 | Ciba | UV Stabilizer | 0.125% |
| — | — | Toluene | 25.5% |
| — | — | Isopropyl alcohol | 24% |

This topcoat is prepared by blending the polyurethane with the ketone to make a first blend which is then mixed with a concentrate prepared from the antioxidant and uv stabilizers. Toluene and isopropyl alcohol are added to the mixture and the mixture is filtered.

The topcoat layer can be applied to the skin layer 18 using known techniques, including multi roll coating, reverse roll coating, blade coating, air knife coating, gravure coating, etc.

In one embodiment, the core layer 16, intermediate layer 17, and each of the skin layers 18 and 20, and topcoat layer are characterized by the absence of polyvinyl chloride (PVC).

In another embodiment, and as illustrated by FIG. 2, a multilayer film has core layer 16, abrasive resistant skin layer 18, and intermediate layer 17 which is in contact with an adhesive or adhesive skin layer 20. The core is composed of those polymers described above. In one embodiment, skin layer 18 and immediate layer 17 have the same composition. In another embodiment, intermediate layer 17 is a stiffness adding layer such as one or more of the above polyolefins or second thermoplastic materials described above. Intermediate layer 17, in one embodiment, has a thickness of about 0.05 to about 1.5 mil, preferably from about 0.1 mil to about 1 mil, or from about 0.15 mil to about 0.65 mil. Applicants have discovered by the inclusion of this intermediate layer, stiffness of the film is improved.

The multilayered thermoplastic films 12 (FIG. 1) and 12A (FIG. 2) may have an overall thickness ranging from about 1 to about 10 mils, and in one embodiment about 1 to about 8 mils, and in one embodiment about 1 to about 5 mils, and in one embodiment about 2 to about 5 mils, and in one embodiment about 2 to about 4 mils, and in one embodiment about 3 mils. The thickness of the core layer 16 may range from about 10% to about 90% of the overall thickness of the multilayered film, and in one embodiment from about 20% to about 80%. In one embodiment, the thickness of the skin/core/skin layers is 10%/80%/10%, and in one embodiment it is 20%/60%/20%. The skin layers 18 and 20 may be of the same thickness or they may have different thicknesses. Preferably, the skin layers 18 and 20 have the same or substantially the same thickness which allows the multilayered film to lay flat and avoid curl. Similarly, each of the skin layers 18 and 20 may have the same composition or they may have different compositions.

The multilayered thermoplastic film 12 (FIG. 1) or 12A (FIG. 2) may be made using a polymeric coextrusion process. The coextrudate of polymeric film materials is formed by simultaneous extrusion from two or more extruders and a suitable known type of coextrusion die whereby the core layer 16 (and optional intermediate layer 17) and the skin layers 18 and 20 are adhered to each other in a permanently combined state to provide a unitary coextrudate. The coextrusion processes for making these multilayered films are well known in the art. Examples of such processes are depicted in FIGS. 3 and 4.

Often the abrasive resistant polymer will develop a static charge during processing. This charge may collect dust on the surface which is objectionable since sign applications require a clean surface. The charge may be minimized by incorporation of an antistatic materials to the skin layer. The antistatic agents may be added as the concentrate containing 5% of the antistatic agent in a polyethylene concentrate. The concentrate is typically used at a level of 6%. The antistatic agent is typically present in an amount from about 100 ppm to about 15,000 ppm, or about 25,000 ppm to about 10,000 ppm or from about 3,000 to about 6,000 ppm. A preferred antistatic agent is glycerol monoleate. Other useful antistatic agents include alkoxylated amines or amides, such as ethoxylated amines or ethoxylated amides.

Figure 3:
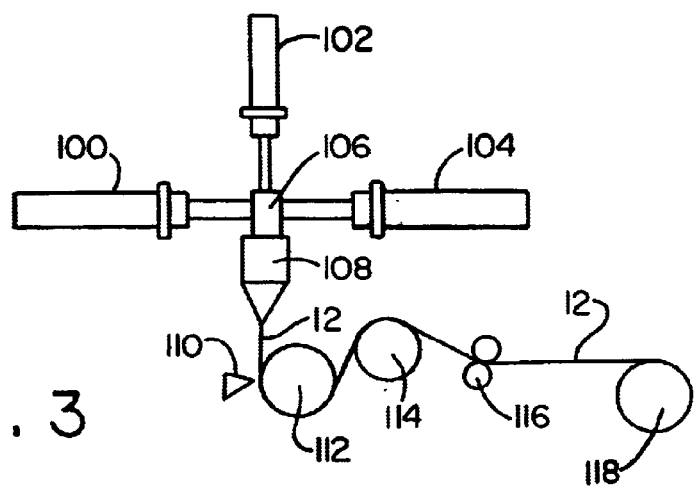
FIG. 3 is a flow sheet illustrating an extrusion process for making the multilayered thermoplastic film illustrated in FIG. 1.

Referring to FIG. 3, an extrusion process for making the multilayered film 12 is disclosed. The apparatus used in this process includes extruders 100, 102 and 104, adapter block 106, extrusion die 108, air knife 110, casting roll 112, chill roll 114, nip rolls 116, and take up reel 118. The polymeric material for forming skin layer 18 is extruded from extruder 100 and then advanced to adapter block 106 and extrusion die 108. The polymeric material for forming core layer 16 is extruded from extruder 102 and then advanced to adapter block 106 and extrusion die 108. The polymeric material for forming skin layer 20 is extruded from extruder 104 and then advanced to adapter block 106 and extrusion die 108. In extrusion die 108 the polymeric materials are combined to form the multilayered film 12. The multilayered film 12 is advanced from extrusion die 108, past air knife 110, under casting roll 112, over chill roll 114, through nip rolls 116 to take-up reel 118 where it is wound to provide multilayered film 12 in roll form.

Figure 4:
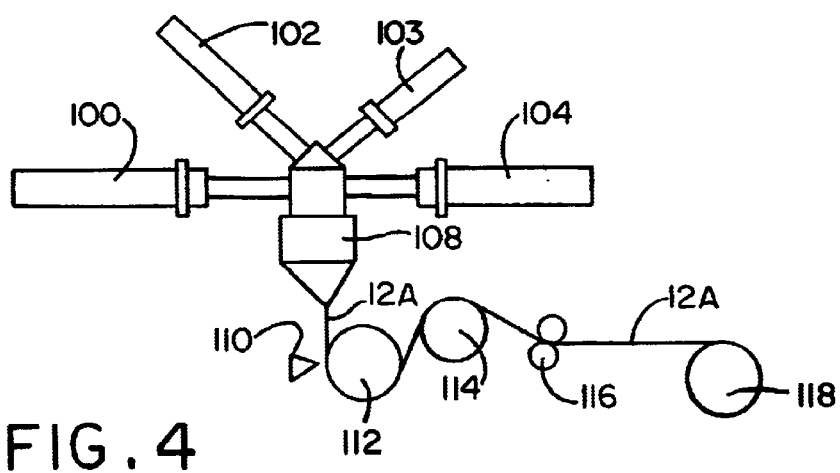
FIG. 4 is a flow sheet illustrating an extrusion process for making the multilayered thermoplastic film illustrated in FIG. 2.

An extrusion process for making the multilayered film 12A is disclosed in FIG. 4. The apparatus used in this process includes extruders 100,102, 103 and 104, adapter block 106, extrusion die 108, air knife 110, casting roll 112, chill roll 114, nip rolls 116, and take up reel 118. The polymeric material for forming skin layer 18 is extruded from extruder 100 and then advanced to adapter block 106 and extrusion die 108. The polymeric material for forming core layer 16 is extruded from extruder 102 and then advanced to adapter block 106 and extrusion die 108. The polymeric material for forming intermediate layer 17 is extruded from extruder 103 and then advanced to adapter block 106 and extrusion die 108. The polymeric material for forming skin layer 20 is extruded from extruder 104 and then advanced to adapter block 106 and extrusion die 108. In extrusion die 108 the polymeric materials are combined to form the multilayered film 12A. The multilayered film 12A is advanced from extrusion die 108, past air knife 110, under casting roll 112, over chill roll 114, through nip rolls 116 to take-up reel 118 where it is wound to provide multilayered film 12A in roll form.

An advantage of the present invention is that the multilayered films 12 and 12A that are employed are easy to process. The presence of the clear skin layers 18 and 20 allows for easy purging and changing of colors during extrusion. These multilayered films sign cut and weed well. They have excellent scuff and abrasion resistant characteristics. They have excellent outdoor weatherability characteristics.

The Pressure Sensitive Adhesive Composite

In one embodiment, the inventive multilayered thermoplastic film is provided as part of a pressure sensitive adhesive composite wherein the multilayered thermoplastic film has a pressure sensitive adhesive laminate adhered to it. The pressure sensitive adhesive laminate is comprised of a layer of a pressure sensitive adhesive adhered to a release liner. The release liner is comprised of a backing liner and a layer of a cured release coating layer adhered the backing liner. The release coating is positioned between the pressure sensitive adhesive and the backing liner. The pressure sensitive adhesive layer is positioned between the second skin layer of the multilayered thermoplastic film and the release coating layer and is preferentially adherent to the second skin layer. Useful embodiments are depicted in FIGS. 5 and 6.

Referring to FIG. 5, a pressure sensitive adhesive composite 10 is disclosed which includes multilayered thermoplastic film 12 and a pressure sensitive adhesive laminate 14. The multilayered film 12 has thermoplastic core layer 16, which has a first side and a second side, a abrasion resistant clear first thermoplastic skin layer 18 overlying the first side of the core layer 16 and second clear thermoplastic skin layer 20 overlying the second side of the core layer 16. The adhesive laminate 14 has a layer of a pressure sensitive adhesive 30 adhered to the skin layer 20, a layer of a release coating 32 overlying and adhered to the pressure sensitive adhesive 30, and backing liner 34 overlying the release coating layer 32. The release coating layer 32 and backing liner 34 combine to form release liner 35.

Referring to FIG. 6, a pressure sensitive adhesive composite 10A is disclosed which includes a multilayered thermoplastic film 12A and a pressure sensitive adhesive laminate 14. The multilayered film 12A has thermoplastic core layer 16, which has a first side and a second side, intermediate layer 17 overlying and adhered to the second side of the core layer 16, abrasion resistant clear first thermoplastic skin layer 18 overlying the first side of the core layer 16, and clear second thermoplastic skin layer 20 overlying the intermediate layer 17. The adhesive laminate 14 has a layer of a pressure sensitive adhesive 30 adhered to the skin layer 20, a layer of a release coating 32 overlying and adhered to the pressure sensitive adhesive 30, and a backing liner 34 overlying the release coating layer 32. The release coating layer 32 and backing liner 34 combine to form release liner 35.

The release coating composition 32 can be any release coating composition known in the art. Silicone release coating compositions are preferred, and any of the silicone release coating compositions which are known in the art can be used. The major component of the silicone release coating is a polyorganosiloxane and more often polydimethylsiloxane. The silicone release coating compositions used in this invention may be room temperature cured, thermally cured, or radiation cured. Generally, the room temperature and thermally curable compositions comprise at least one polyorganosiloxane and at least one catalyst (or curing agent) for such polyorganosiloxane(s). Such compositions may also contain at least one cure accelerator and/or adhesivity promoter. As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

The release coating composition 32 is applied to the backing liner 34 using known techniques. These include gravure, reverse gravure, offset gravure, roller coating, brushing, knife-over roll, metering rod, reverse roll coating, doctor knife, dipping, die coating, spraying curtain coating, and the like. The coat weight is in the range of about 0.1 to about 10 grams per square meter (gsm) or more, and in one embodiment about 0.3 to about 2 gsm. In one embodiment, the thickness or caliper of the resulting release liner may range from about 4 to about 10 mils, and in one embodiment from about 4 or 4.5 mils to about 6 mils.

The backing liner 34 may comprise paper, polymer film, or a combination thereof. Paper liners are useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the substrate material. Thus, any type of paper can be used depending upon the end use and particular personal preferences. Included among the types of paper which can be used are clay coated paper, glassine, polymer coated paper, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and papers having weights in the range of from about 60 to about 100 pounds per ream are presently preferred. The te"m "r"am" as used herein equals 3000 square feet.

Alternatively, the backing liner 34 may be a polymer film, and examples of polymer films include polyolefin, polyester, and combinations thereof. The polyolefin films may comprise polymer and copolymers of monoolefins having from 2 to about 12 carbon atoms, and in one embodiment from 2 to about 8 carbon atoms, and in one embodiment 2 to about 4 carbon atoms per molecule. Examples of such homopolymers include polyethylene, polypropylene, poly-1-butene, etc. The examples of copolymers within the above definition include copolymers of ethylene with from about 1% to about 10% by weight of propylene, copolymers of propylene with about 1% to about 10% by weight of ethylene or 1-butene, etc. Films prepared from blends of copolymers or blends of copolymers with homopolymers also are useful. The films may be extruded in mono or multilayers.

Another type of material which can be used as the backing liner 34 is a polycoated kraft liner which is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the liner. The weight of these types of liners ranges from about 30 to about 100 pounds per ream, with about 94 to about 100 pounds per ream representing a typical range. In total, the final liner is comprised of between 10% and 40% polymer and from 60% to 90% paper. For two sided coatings, the quantity of polymer is approximately evenly divided between the top and bottom surface of the paper.

The pressure-sensitive adhesive 30 can be any pressure sensitive adhesive known in the art. These include rubber based adhesives, acrylic adhesives, vinyl ether adhesives, silicone adhesives, and mixtures of two or more thereof. Included are the pressure sensitive adhesive materials described "n "Adhesion and Bond"ng", *Encyclopedia of Polymer Science and Engineering,* Vol. 1, pages 476–546, Interscience Publishers 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of abo-t −70° C. to about 10° C.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers).

The layer of pressure sensitive adhesive 30 generally has a thickness of about 0.2 to about 2.5 mils, and in one embodiment about 0.5 to about 1.5 mils. In one embodiment, the coat weight of the pressure sensitive adhesive is in the range of about 10 to about 50 grams per square meter (gsm), and in one embodiment about 20 to about 35 gsm.

The pressure sensitive adhesive 30 can be applied to the skin layer 20 of the multilayered film, or to the cured release coating layer 32 of the release liner 35 using known techniques. These include gravure, reverse gravure, offset gravure, roller coating, brushing, knife-over roll, metering rod, reverse roll coating, doctor knife, dipping, die coating, spraying, curtain coating, and the like. When the adhesive 30 is applied to the multilayered thermoplastic film 12 or 12A, the pressure sensitive adhesive composite 10 or 10A is assembled by contacting the release liner 35 and the adhesive 30 using known techniques. When the adhesive 30 is applied to the release liner 35, the pressure sensitive adhesive composite 10 or 10A is assembled by contacting the multilayered thermoplastic film 12 or 12A and the adhesive 30 using known techniques. In the assembled pressure sensitive adhesive composite 10 or 10A, the pressure sensitive adhesive 30 is positioned between the multilayered thermoplastic film 12 or 12A and the cured release coating 32, and is preferentially adhered to the multilayered thermoplastic film 12 or 12A. The cured release coating 32 is positioned between the pressure sensitive adhesive 30 and the backing liner 34, and is preferentially adhered to the backing liner 34.

In one embodiment, the pressure sensitive adhesive composite 10 or 10A has a thickness in the range of about 5 to about 25 mils, and in one embodiment about 8 to about 20 mils.

The following examples are provided to further disclose the invention. In these examples as well as throughout the specification and in the claims, unless otherwise indicated, all parts and percentages are by weight.

EXAMPLE 1

The multilayered film 12 comprised of core layer 16 and skin layers 18 and 20 is coextruded. The core layer 16 has the following composition:

| | |
|---|---|
| 83% | Huntsman 1080 |
| 12% | Ampacet Black 190303 |
| 3% | Surlyn 1605 |
| 2% | Ampacet 10919 |

Core layer 16 has a UV light stabilizer concentration of 4,800 ppm which is provided with the Ampacet Black 190303. The UV light stabilizer is Chemissorb 944. Skin layer 18 has the following composition:

| | |
|---|---|
| 93% | Surlyn 1605 |
| 7% | Ampacet 10561 |

Skin layer 18 has a UV light stabilizer concentration of 14,000 ppm which is provided with the Ampacet 10561. Skin layer 20 has the following composition:

| | |
|---|---|
| 95% | Huntsman 1080 |
| 3% | Ampacet 10561 |
| 2% | Ampacet 10919 |

Skin layer 20 has a UV light stabilizer concentration of 6,000 ppm which is provided by the Ampacet 10561.

EXAMPLE 2

The multilayered film 12 comprised of core layer 16 and skin layers 18 and 20 is coextruded. Core layer 16 has the following composition:

| | |
|---|---|
| 77% | Dowlex 2036A |
| 10% | Ampacet Black 190303 |
| 10% | Quantum 285-003 |
| 3% | Surlyn 1605 |

Core layer 16 has a UV light stabilizer concentration of 4,000 ppm which is provided by the Ampacet Black 190303. The UV light stabilizer is Chemissorb 944. Each of the skin layers 18 and 20 have the following composition:

| | |
|---|---|
| 91% | Surlyn 1605 |
| 5% | Ampacet 10561 |
| 4% | Ampacet 10061 |

Each of the skin layers 18 and 20 has a UV light stabilizer concentration of 10,000 ppm which is provided by the Ampacet 10561.

EXAMPLE 3

The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 76% | Huntsman 1080 |
| 12% | Ampacet Black 190303 |
| 8% | Surlyn 9120 |
| 4% | Ampacet 10919 |

Core layer 16 has a UV light stabilizer concentration of 4,800 ppm. The UV light stabilizer is Chemissorb 944 and is provided with the Ampacet Black 190303. Skin layer 18 has the following composition:

| | |
|---|---|
| 92% | Surlyn 9120 |
| 8% | Ampacet 10561 |

Skin layer 18 has a UV light stabilizer concentration of 16,000 ppm. The UV light stabilizer is Chemissorb 944 and is provided with the Ampacet 10561. Skin layer 20 has the following composition:

| | |
|---|---|
| 92% | Huntsman 1080 |
| 5% | Ampacet 10561 |
| 3% | Ampacet 10919 |

Skin layer 20 has a UV light stabilizer concentration of 10,000 ppm. The UV light stabilizer is Chemissorb 944 and is provided with the Ampacet 10561.

Abrasion tests are conducted on the foregoing multilayer film following the procedure provided for in ASTM D4060-84. The abrasive wheel is No. CS-10 and the arm weight is 250 grams. The test is conducted by varying the grinding cycles to produce scuffing that can be read with a glossometer. The 60° angle gloss readings are as follows:

| Cycles | Gloss Reading |
|---|---|
| Control (Zero Cycles) | 88 |
| 5 | 78 |
| 10 | 69 |
| 25 | 59 |
| 50 | 46 |
| 100 | 23 |

The foregoing multilayered film is tested for outdoor weatherability using a Xenon Arc weather-o-meter supplied by Atlas. The Xenon Arc weather-o-meter program used was Automotive Test Method SAE J 1960. The criteria for failure is ΔE>5 for color failure and a 25 point drop in gloss for 60° gloss. The number of xenon hours to color failure is 2677 hours, and the number of xenon hours to gloss failure is 2677 hours. These values are significant due to the fact that it is generally considered that 2000 hours of Xenon Arc simulated weather-o-meter testing is roughly equivalent to 5 years of vertical outdoor exposure in North America.

EXAMPLE 4

The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 77% | Dowlex 2036A |
| 10% | Quantum 285-003 |
| 10% | Ampacet Black 190303 |
| 3% | Surlyn 1605 |

Core layer 16 has a UV light stabilizer concentration of 4,000 ppm. The UV light stabilizer is Chemissorb 944 and is provided with Ampacet Black 190303. Skin layers 18 and 20 have the following composition:

| | |
|---|---|
| 91% | Surlyn 1605 |
| 5% | Ampacet 10561 |
| 4% | Ampacet 10061 |

Skin layers 18 and 20 have UV light stabilizer concentrations of 10,000 ppm. The UV light stabilizer is Chemissorb 944 and is provided with the Ampacet 10561.

The foregoing thermoplastic film is tested for outdoor weatherability using the procedure described in Example 3. The number of xenon hours to color failure is 3544 hours. The number of xenon hours to gloss failure is 2677 hours.

EXAMPLE 5

The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 83% | Huntsman 1080 |
| 12% | Ampacet Black 190303 |
| 3% | Surlyn 1605 |
| 2% | Ampacet 10919 |

Core layer 16 has a UV light stabilizer concentration of 4,800 ppm. The UV light stabilizer is Chemissorb 944 and is provided with the Ampacet Black 190303. Skin layer 18 has the following composition:

| | |
|---|---|
| 93% | Surlyn 1605 |
| 7% | Ampacet 10561 |

Skin layer 18 has a UV light stabilizer concentration of 14,000 ppm. The UV light stabilizer is Chemissorb 944 and is provided with the Ampacet 10561. Skin layer 20 has the following composition:

| | |
|---|---|
| 95% | Huntsman 1080 |
| 3% | Ampacet 10561 |
| 2% | Ampacet 10919 |

Skin layer 20 has a UV light stabilizer concentration of 6,000. The UV light stabilizer is Chemissorb 944 and is provided with the Ampacet 10651.

Color measurements are conducted on the foregoing multilayer film using a Hunter Lab MiniScan Spectrocolorimeter Model MS 4500L with a geometry of 45/φ, a viewing area of large, an illuminant of D65 and 10° standard observer with the result being an L number of 7.5. This value for the L number is significant. The L number is from the L, a, b optical scale. An L number of zero corresponds to absolute black and for black films the lower the L number the better. L numbers typically observed for conventional black polyolefin films are in the range of about 10–12. On the other hand, L numbers typically observed for dispersion cast black vinyl films used in the industry are in the range of about 5–7. Thus, the L number of 7.5 observed for the tested sample closely approximates the values typically observed for dispersion case black vinyl films.

EXAMPLE 6

The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 79% | Huntsman 1080 |
| 12% | Ampacet Black 190303 |
| 5% | Surlyn 9120 |
| 4% | Ampacet 10919 |

Core layer 16 has a UV light stabilizer concentration of 4,800 ppm. The UV light stabilizer is Chemissorb 944 and is provided with the Ampacet Black 190303. Skin layer 18 has the following composition:

| | |
|---|---|
| 92% | Surlyn 9120 |
| 8% | Ampacet 10561 |

Skin layer 18 has a UV light stabilizer concentration of 16,000 ppm. The UV light stabilizer is Chemissorb 944 and is provided with the Ampacet 10561. Skin layer 20 has the following composition:

| | |
|---|---|
| 92% | Huntsman 1080 |
| 5% | Ampacet 10561 |
| 3% | Ampacet 10919 |

Skin layer 20 has a UV light stabilizer concentration of 10,000 ppm. The UV light stabilizer is Chemissorb 944 and is provided with the Ampacet 10561.

Color measurements on the foregoing thermoplastic film are conducted in the same manner as indicated in Example 5 with the result being a Hunter color L number of 6.6.

EXAMPLE 7

The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 74% | Huntsman 1080 |
| 12% | Ampacet Black 190303 |
| 10% | Surlyn 9120 |
| 4% | Ampacet 10919 |

Core layer 16 has a UV light stabilizer concentration of 4,800 ppm. The UV light stabilizer is Chemissorb 944 and is provided with the Ampacet Black 190303. Skin layer 18 has the following composition:

| | |
|---|---|
| 92% | Surlyn 9120 |
| 8% | Ampacet 10561 |

Skin layer 18 has a UV light stabilizer concentration of 16,000 ppm. The UV light stabilizer is Chemissorb 944 and is provided with the Ampacet 10561. Skin layer 20 has the following composition:

| | |
|---|---|
| 92% | Huntsman 1080 |
| 5% | Ampacet 10561 |
| 3% | Ampacet 10919 |

Skin layer 20 has a UV light stabilizer concentration of 10,000 ppm. The UV light stabilizer is Chemissorb 944 and is provided with the Ampacet 10561.

Color measurements on the foregoing thermoplastic film are conducted in the same manner as indicated in Example 5 with the result being a Hunter color L number 6.9.

EXAMPLE 8

The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 64% | Huntsman 1080 |
| 12% | Ampacet Black 190303 |
| 20% | Surlyn 9120 |
| 4% | Ampacet 10919 |

Core layer 16 has a UV light stabilizer concentration of 4,800 ppm. The UV light stabilizer is Chemissorb 944 and is provided with the Ampacet Black 190303. Skin layer 18 has the following composition:

| | |
|---|---|
| 92% | Surlyn 9120 |
| 8% | Ampacet 10561 |

Skin layer 18 has a UV light stabilizer concentration of 16,000 ppm. The UV light stabilizer is Chemissorb 944 and is provided with the Ampacet 10561. Skin layer 20 has the following composition:

| | |
|---|---|
| 92% | Huntsman 1080 |
| 5% | Ampacet 10561 |
| 3% | Ampacet 10919 |

Skin layer 20 has a UV light stabilizer concentration of 10,000 ppm. The UV light stabilizer is Chemissorb 944 and is provided with the Ampacet 10561.

Color measurements on the foregoing thermoplastic film are conducted in the same manner as indicated in Example 5 with the result being a Hunter color L number of 7.2.

EXAMPLE 9

The multilayered film 12A comprised of core layer 16, supplemental core layer 17, and skin layers 18 and 20 is coextruded. The core layer 16 has a thickness of 2.1 mils and the following composition:

| | |
|---|---|
| 81% | Huntsman 1080 |
| 12% | Ampacet LR 86813 Yellow UV PE MB |
| 4% | Ampacet 10919 |
| 3% | Surlyn 1605 |

Core layer 16 has a UV light stabilizer concentration of 9000 ppm which is provided with the Ampacet LR 86813 Yellow UV PE MB. The UV light stabilizer is Tinuvin 783. Intermediate layer 17 has a thickness of 0.3 mil and the following composition:

| | |
|---|---|
| 85% | Huntsman 1080 |
| 11% | Ampacet Grey LR 89933 |
| 4% | Ampacet 10919 |

Intermediate layer 17 has a UV light stabilizer concentration of 4950 ppm. The UV light stabilizer is Tinuvin 783 and it is provided with the Ampacet Grey LR 89933. Skin layer 18 has a thickness of 0.3 mil and the following composition:

| | |
|---|---|
| 90% | Surlyn 9120 |
| 8% | Ampacet 10561 |
| 2% | Ampacet 10919 |

Skin layer 18 has a UV light stabilizer concentration of 16,000 ppm which is provided with the Ampacet 10561. The UV light stabilizer is Chemissorb 944. Skin layer 20 has a thickness of 0.3 mil and the following composition:

| | |
|---|---|
| 94% | Huntsman 1080 |
| 3% | Ampacet 10561 |
| 3% | Ampacet 10919 |

Skin layer 20 has a UV light stabilizer concentration of 6,000 ppm. The UV light stabilizer is Chemissorb 944. It is provided with the Ampacet 10561.

EXAMPLE 10

The multilayered film 12A comprised of core layer 16, intermediate layer 17, and skin layers 18 and 20 is coextruded. The core layer 16 has a thickness of 2.1 mils and the following composition:

| | |
|---|---|
| 81% | Huntsman 1080 |
| 12% | Ampacet LR 86810 Red PE MB |
| 4% | Ampacet 10919 |
| 3% | Surlyn 1605 |

Core layer 16 has a UV light stabilizer concentration of 9,000 ppm which is provided with the Ampacet LR 86810 Red PE MB. The UV light stabilizer is Tinuvin 783. Intermediate layer 17 has a thickness of 0.3 mil and the following composition:

| | |
|---|---|
| 85% | Huntsman 1080 |
| 11% | Ampacet Grey LR 89933 |
| 4% | Ampacet 10919 |

Intermediate layer 17 has a UV light stabilizer concentration of 4950 ppm. The UV light stabilizer is Tinuvin 783. It is provided with the Ampacet Grey LR 89933. Skin layer 18 has a thickness of 0.3 mil and the following composition:

| | |
|---|---|
| 90% | Surlyn 9120 |
| 5% | Ampacet 10561 |
| 2% | Ampacet 10919 |

Skin layer 18 has a UV light stabilizer concentration of 16,000 ppm which is provided with the Ampacet 10561. The UV light stabilizer is Chemissorb 944. Skin layer 20 has a thickness of 0.3 mil and the following composition:

| | |
|---|---|
| 94% | Huntsman 1080 |
| 3% | Ampacet 10561 |
| 3% | Ampacet 10919 |

Skin layer 20 has a UV light stabilizer concentration of 6,000 ppm which is provided by the Ampacet 10561.

EXAMPLE 11

Part A: The multilayered film 12, which is comprised of core layer 16 having a thickness of 2.4 mils, skin layer 18 having a thickness of 0.3 mil, and skin layer 20 having a thickness of 0.3 mil, is coextruded. The core layer 16 has the following composition:

| | |
|---|---|
| 83% | Huntsman 1080 |
| 12% | Ampacet Black 190303 |
| 3% | Surlyn 9120 |
| 2% | Ampacet 10919 |

Core layer 16 has a UV light stabilizer concentration of 4,800 ppm. The UV light stabilizer is Chemissorb 944 and is provided with the Ampacet Black 190303. Skin layer 18 has the following composition:

| | |
|---|---|
| 93% | Surlyn 9120 |
| 7% | Ampacet 10561 |

Skin layer 18 has a UV light stabilizer concentration of 14,000 ppm. The UV light stabilizer is Chemissorb 944 and is provided with the Ampacet 10561. Skin layer 20 has the following composition:

| | |
|---|---|
| 95% | Huntsman 1080 |
| 3% | Ampacet 10561 |
| 2% | Ampacet 10919 |

Skin layer 20 has a UV light stabilizer concentration of 6,000. The UV light stabilizer is Chemissorb 944 and is provided with the Ampacet 10651.

Part B: The multilayered film from Part A has a topcoat layer adhered to skin layer 18. The topcoat layer has a thickness of 6 microns and has the following composition:

| Tradename | Supplier | Description | Weight % |
|---|---|---|---|
| Cyracure UVR-6110 | Union Carbide | Epoxy Resin | 87.7 |
| Cyracure UVR-6974 | Union Carbide | Photoinitiator | 8.0 |
| Tone 301 | Union Carbide | Caprolactone Polyol | 4.3 |

The topcoat layer is cured using a seven-roll coater run at a speed of 600 feet per minute using two banks of 600 watts per inch fusion bulbs, type H, in air.

The multilayered films from Parts A and B are tested for gloss, and abrasion and scuff resistance using the procedure described in Example 3 with the following results:

| | 60° Gloss Reading | |
|---|---|---|
| Cycle | Part A Film | Part B Film |
| Control (Zero Cycles) | 88 | 94 |
| 5 | 77.8 | 87.5 |
| 10 | 68.8 | 84.3 |
| 25 | 58.8 | 76.8 |
| 50 | 45.8 | 74.8 |

EXAMPLE 12

A series of 3.0 mil monolayer, unstabilized, metallocene polyethylene cast extrusion films formed stress cracks after 800 hours of artificial weathering in the Xenon weather-o-meter which is programmed for an automotive cycle. A hindered amine stabilizer (HAS) was incorporated into the film mix to improve the film durability. Black and white pigmented metallocene polyethylene films using a (HAS) were made.

Mono layer films of Dow metallocene ethylene-octene (Affinity 1030 HF) copolymers containing approximately 1400 ppm of HAS (Ampacet Black Concentrate with Chemissorb 944) lasted 3771 hours of Xenon exposure with no gloss reduction. Black vinyl film showed a 20 point gloss reduction which is noticeable for the same time exposure as the Affinity 1030 HF film.

Black Pigmented Film Formulation:

| | |
|---|---|
| 7.0% | Ampacet Black 190303 (contains 2.0% U.V. stabilizer Chemissorb 944) |
| 93.0% | Dow Metallocene Affinity 1030 HF (LMDPE - Linear Medium Density PE.) |

White Pigmented Film Formulation:

| | |
|---|---|
| 15.0% | Ampacet White 110233 (contains 4.0% U.V. stabilizer) |
| 85.0% | Dow Metallocene Affinity 1030 HF (LMDPE - Linear Medium Density PE.) |

The extrusion cast films were made on an extrusion line having the capability of using three (3) extruders and three (3) or more layer(s) capability. More layers can be made by utilizing a different selector plug and splitting the melt streams.

| | | | |
|---|---|---|---|
| Die Zone Temperatures: | 1 - 395° F. | 2 - 395° F. | 3 - 395° F. |
| Extruder Zone Temperatures: | Zone 1 - 350° F. | Zone 2 - 350° F. | |
| | Zone 3 - 410° F. | Zone 4 - 420° F. | |
| Adapter Zone Temperature | 400° F. | | |
| Feedblock Zone Temperature | 400° F. | | |
| Extruder RPM | 59 | | |

| Hunter Color Lab Data | L | a | b | 60° Gloss (MD) |
|---|---|---|---|---|
| White | 92.9 | −1.1 | 1.6 | 86 |
| Black | 11.5 | −0.2 | −0.2 | 86 |
| Xenon Durability | Delta E > 5.0 | | Gloss Reduction > 25 pts. | |
| White | 3870 hrs. | | 3870 hrs. | |
| Black | 3771 hrs. | | 3771 hrs. | |

| | 60° Gloss Readings (Cycle) | | | | |
|---|---|---|---|---|---|
| Taber Abrasion | 0 | 5 | 10 | 25 | 50 |
| White | 84.2 | 62 | 50 | 33 | 22 |
| Black (PVC) | 98 | 83 | 76 | 63 | 39 |

| Gurley Stiffness (Machine Direction) | |
|---|---|
| Black (PVC) | 5.6 |
| Black (invention) | 16.4 |
| Distinctness of Image (D-I - machine direction) | |
| Black (PVC) | 36 |
| Black (invention) | 31 |

EXAMPLE 13

A three layer, 3.0 mil multilayer film was prepared where the same skin layer on each side of the core layer. The core layer has a thickness 2.4 and the skin layer have a thickness of 0.3 mil each.

(A) Olympic Blue Film—3 Layer Coextrusion with ABA Structure:

| Pigmented or Core Layer Formulation | |
|---|---|
| 13.5% | Ampacet Olympic Blue LR 86732 |
| 86.5% | Dow Metallocene Affinity 1030 HF (LMDPE) |
| Skin Layer Composition: Same for both layers | |
| 95.0% | Dow Metallocene Affinity 1030 HF (LMDPE) |
| 5.0% | Ampacet 10561 |

(B) Dark Green Fi-m—3 Layer Coextrusion with ABA structure:

| Core or Pigmented Layer Formulation | |
|---|---|
| 12.0% | Ampacet Dark Green LR 86800 |
| 88.0% | Dow Metallocene Affinity 1030 HF (LMDPE) |
| Skin Layer Composition: Same for both layers | |
| 95.0% | Dow Metallocene Affinity 1030 HF (LMDPE) |
| 5.0% | Ampacet 10561 |

Extruder #1 (Skin Layer)     Extruder RPM - 13.5
Extruder Zone Temperatures:

Zone 1 - 350° F.    Zone 2 - 400° F.    Zone 3 - 420° F.
Adapter Temperature:    420° F.
Extruder #2 (Skin Layer):    Extruder RPM - 18.5
Extruder Zone Temperatures:

Zone 1 - 350° F.    Zone 2 - 400° F.    Zone 3 - 420° F.
Adapter Temperature:    420° F.
Main or Core Extruder:    Extruder RPM - 341
Extruder Zone Temperatures:

Zone 1 - 350° F.    Zone 2 - 400° F.    Zone 3 - 420° F.
Adapter Temperature:    420° F.
Feedblock Zone Temperature:    400° F.
Die Zone Temperatures:

Zone 1 - 395° F.    Zone 2 - 395° F.    Zone 3 - 395° F.
Physical Properties:

| Hunter Color Lab Data | L | a | b | 60° Gloss |
|---|---|---|---|---|
| Olympic Blue | 43.9 | −18.5 | −41.7 | 80 |
| Dark Green | 24.9 | −20.7 | 5.4 | 80 |
| Xenon Durability | Delta E > 5.0 | | Gloss Reduction > 25 pts. | |
| Olympic Blue | 3725 hrs. | | 3521 hrs. | |
| Dark Green | 5004 hrs. | | 2243 hrs. | |

| | 60° Gloss Readings (Cycle) | | | | |
|---|---|---|---|---|---|
| Taber Abrasion | 0 | 5 | 10 | 25 | 50 |
| Olympic Blue | 84.7 | 57 | 44 | 28 | 16 |
| Dark Green | 85.6 | 59 | 48 | 30 | 21 |
| Black (PVC) | 98 | 83 | 76 | 63 | 39 |

| Gurley Stiffness (Machine Direction) | |
|---|---|
| Black (PVC) | 5.6 |
| Olympic Blue (invention) | 15.5 |
| Dark Green (invention) | 16.4 |
| Distinctness of Image (D-I - machine direction) | |
| Black (PVC) | 36 |
| Olympic Blue (Invention) | 31 |
| Dark Green (Invention) | 32 |

EXAMPLE #14

Pigmented three layer films were prepared by coextruding a 2.5 mil thick core layer and two skins layer each of which is 0.25 mi A) White Pigmented Fi-m—3 Layer Coextrusion with ABA structure:

| Pigmented or Core Layer Formulation | |
|---|---|
| 22.0% | Ampacet White 110233 |
| 78.0% | Dow Metallocene Affinity 1030 HF (LMDPE) |

-continued

| Skin Layer Composition: Same for both layers | |
|---|---|
| 95.0% | Dow Metallocene Affinity 1030 HF (LMDPE) |
| 5.0% | Ampacet 10561 U.V. PE Concentrat |

Black Pigmented Fi-m—3 Layer Coextrusion with ABA structure:

| Core or Pigmented Layer Formulation | |
|---|---|
| 8.5% | Ampacet Black 190303 |
| 91.5% | Dow Metallocene Affinity 1030 HF (LMDPE) |
| Skin Layer Composition: Same for both layers | |
| 95.0% | Dow Metallocene Affinity 1030 HF (LMDPE) |
| 5.0% | Ampacet 10561 |

(C) Cardinal Red Pigmented Film—3 Layer Coextrusion with ABA Structure:

| Core or Pigmented Layer Formulation | |
|---|---|
| 16.0% | Ampacet Cardinal Red 150380 (LR 87075) |
| 84.0% | Dow Metallocene Affinity 1030 HF (LMDPE) |
| Skin Layer Composition: Same for both layers | |
| 95.0% | Dow Metallocene Affinity 1030 HF (LMDPE) |
| 5.0% | Ampacet 10561 |

(D) Sapphire Blue Pigmented Film—3 Layer Coextrusion with ABA Structure:

| Core or Pigmented Layer Formulation | |
|---|---|
| 12.0% | Ampacet Sapphire Blue LR 86804 |
| 88.0% | Dow Metallocene Affinity 1030 HF (LMDPE) |
| Skin Layer Composition: Same for both layers | |
| 95.0% | Dow Metallocene Affinity 1030 HF (LMDPE) |
| 5.0% | Ampacet 10561 U.V. PE Conc) |

Film—3 Layer Coextrusion with ABA Structure:

| Core or Pigmented Layer Formulation | |
|---|---|
| 12.0% | Ampacet Canary Yellow LR 87085 |
| 88.0% | Dow Metallocene Affinity 1030 HF (LMDPE) |
| Skin Layer Composition: Same for both layers | |
| 95.0% | Dow Metallocene Affinity 1030 HF (LMDPE) |
| 5.0% | Ampacet 10561 |

| Hunter Color Lab Data | L | A | b | 60° Gloss (MD) |
|---|---|---|---|---|
| White | 93.8 | −1.3 | 0.9 | 86.0 |
| Black | 11.0 | −0.2 | 0.0 | 83.9 |
| Cardinal Red | 29.7 | 49.1 | 17.1 | 86.0 |
| Sapphire Blue | 19.1 | 2.9 | −36.6 | 87.0 |
| Canary Yellow | 74.3 | 15.8 | 44.3 | 82.0 |

-continued

| Xenon Durability | Delta E > 5.0 | Gloss Reduction > 25 pts. |
|---|---|---|
| White | 6733 hrs. | 5730 hrs. |
| Black | 6570 hrs. | 5425 hrs. |
| Cardinal Red | 5435 hrs. | 5435 hrs. |
| Sapphire Blue | 3381 hrs. | 2900 hrs. |
| Canary Yellow | 3705 hrs. | 6733 hrs. |

| | 60° Gloss Readings (Cycles) | | | | |
|---|---|---|---|---|---|
| Abrasion Testing | 0 | 5 | 10 | 25 | 50 |
| Black (Invention) | 83 | 48 | 39 | 22 | 16 |
| Black (PVC) | 98 | 83 | 76 | 63 | 39 |

| Distinctness of Image (D-I - machine direction) | |
|---|---|
| Black (Invention) | 37 |
| Black (PVC) | 36 |

EXAMPLE #15

A series of 3 layer coextrusions with clear skin layers and 5 different color pigments were coextruded with two types of PE resins: Dow Metallocene LMDPE and Quantum MDPE. The core layer consisted of a single PE resins component and pigmented concentrate. The Xenon weather-o-meter results show that properly stabilize the Quantum MDPE is as durable as the Dow Metallocene LMDPE with one exception: the MDPE sign cuts and weeds better than the Met. LMDPE and does well at small letters (¼ inch).

The following information relates to using a one component system of MDPE in the core or pigmented layer with clear skins of MDPE on adjacent sides of the film. The films made were made in the following colors: white, black, canary yellow, sapphire blue and cardinal red. These films cut and weeded well even at ¼ inch size letters on the Gerber Edge and Roland sign cutting units and had excellent durability compared to Cast PVC films but slightly less durability than the Dow Metallocene Affinity 1030 HF films. For the signage application the durability is acceptable.

| Hunter Color Lab Data | L | A | b | 60° Gloss (MD) |
|---|---|---|---|---|
| White | 94.3 | −1.3 | 0.7 | 81.9 |
| Canary Yellow | 73.6 | 17.2 | 44.7 | 91.3 |
| Cardinal Red | 28.2 | 50.4 | 16.9 | 87.6 |
| Sapphire Blue | 18.5 | 3.2 | −36.5 | 85.2 |
| Black | 9.2 | 0 | 0.4 | 86.6 |

One can observe from the following Table that in most cases the 3 layer coextruded pigmented MDPE films are comparable and in most cases better than Vinyl (PVC) pigmented films of the same color. This is significant and the trick is to find a material that will give scuff resistance and minimize the milkiness appearance without sacrificing sign cutting & weeding and outdoor durability.

| Xenon Durability | Delta E > 5.0 | Gloss Reduction > 25 pts. |
|---|---|---|
| White | 6464 hrs. | 6049 hrs. |
| White (PVC) | 3718 hrs. | 2086 hrs. |
| Canary Yellow | 5130 hrs. | 6442 hrs. |
| Canary Yellow (PVC) | 2259 hrs. | 2259 hrs. |
| Cardinal Red | 6417 hrs. | 6253 hrs. |
| Cardinal Red (PVC) | 2931 hrs. | 2369 hrs. |
| Sapphire Blue | 2656 hrs. | 2656 hrs. |
| Sapphire Blue (PVC) | 2752 hrs. | 2938 hrs. |
| Black (Invention) | 6130 hrs. | 3879 hrs. |
| Black (PVC) | 3906 hrs. | 4740 hrs. |

EXAMPLE #16

A 3.0 mil multilayer film was prepare with Packaging grade Surlyn resins. The films were evaluated for improved abrasion resistance and improvement in clarity which would give a less milky appearance. The core layer was 2.4 mils and each skin layer was 0.3 mil. The films were made by conextrusionA) Black Pigmented Film Formulati-n—3 Layer Coextrusion with ABA Structure

| Skin Layers A on both surfaces of the Core | |
|---|---|
| 93.0% | DuPont Surlyn (Packaging Grade) 1802 |
| 6% | Ampacet 10561 U.V. in concentrate |
| 5% | Ampacet Slip Agent 10061 |
| 12000 ppm | UV Light Stabilizer Chemissorb 944 in layer |
| Core or Pigmented Layer | |
| 94% | Dow Metallocene Affinity 1030 HF |
| 6% | Ampacet Black 190303 (contains U.V. in concentrate) |

| Hunter Color Lab Data | L |
|---|---|
| Black (invention) | 9.2 |
| Black (PVC) | 6.7 |

| Xenon Durability | Delta E > 5.0 | Gloss Reduction > 25 pts. |
|---|---|---|
| Black (Invention) | 1130 hrs. | 1130 hrs. |
| Black (PVC) | 3186 hrs. | 3186 hrs. |

EXAMPLE #17

Multilayer films with Packaging grade Surlyn resins were evaluated for improved abrasion resistance and improvement in clarity which would give a less milky appearance. The films were 3.0 mil thick with a 2.4 mil core and each skin layer being 0.3 mil.A) Black Pigmented Film Formulati-n—3 Layer Coextrusion with ABC structure

| Skin Layer A | |
|---|---|
| 93.0% | DuPont Surlyn (Packaging Grade) 1802 |
| 7% | Ampacet 10561 contains 12000 ppm UV Light stabilizer Chemissorb |
| Core or Pigmented Layer | |
| 83% | Huntsman MDPE PE-1080 |
| 12% | Ampacet Black 190303 contains 4,000 ppm Chemissorb 944 |
| 3% | DuPont Surlyn 1605 |
| 2% | Ampacet 10919 Processing Aid |

-continued

| Skin Layer C | |
|---|---|
| 95% | Huntsman MDPE PE-1080 |
| 3% | Ampacent U.V. 10651 |
| 2% | Ampacet 10919 Processing Aid |

| Hunter Color Lab Data | L |
|---|---|
| Black (invention) | 7.5 |
| Black (PVC) | 6.7 |

| Xenon Durability | Delta E > 5.0 | Gloss Reduction > 25 pts. |
|---|---|---|
| Black | 2103 hrs.* | 2103 hrs.* |
| Black (PVC) | 3186 hrs. | 3186 hrs. |

| | 60° Gloss Readings (Cycles) | | |
|---|---|---|---|
| Abrasion Testing | 0 | 5 | 10 |
| Black (Invention) | 83 | 72 | 67 |
| Black (PVC) | 95 | 76.5 | 69.3 |

*samples did not fail, but were inadvertently removed from the test.

EXAMPLE #18

A film formulated with a Surlyn top layer was used along with single component polyethylene resins in the pigmented core layer. Non-pigmented Suryln layers would be coextruded on both adjacent sides of a pigmented core layer with contained a single component polyethylene resin such as Dow Affinity 1030 HF polyethylene resin and blends of Dow Metallocene Afffinity 1030 HF and Quantum MDPE resin.

The following formulations were made comprising clear (non-pigmented) Surlyn skin layers on both adjacent sides of a pigmented core layer. This film contained a single component PE resin in the core and the adjacent Surlyn skin layer that would be in contact with the pressure sensitive adhesive would act as a adhesive side layer for the film to bond to the pressure sensitive adhesive. The multilayer film (ABA type structure) has a thickness of 3.9 mil, with the core layer being 2.4 mils, each skin layer being 0.3 mil.

22. A) ABA Type Film

| Surlyn Skin Layer Formulation: | |
|---|---|
| 89.0% | DuPont Surlyn 1802 (Pkg Grade Surlyn) |
| 6.0% | Ampacet Black 190303 |
| 5.0% | Ampacet 10061 |
| Pigmented Core Layer Thickness: | |
| 94.0% | Dow Metallocene Affinity 1030 HF |
| 6.0% | Ampacet Black 190303 |

Xenon Durability—Simulated Outdoor Exposure in Hours

Hours of exposure to failure in color and gloss

Change in color of delta EE>5.0 is considered a failure and a reduction in 60° gloss by 25 points or higher from initial reading is considered a failure Fail gloss criteria at 1130 hours Fail color Delta E>5.0) at 848 hrs Vinyl film failed the Durability test for color at 3906 hrs and failed the 60° gloss test at 4740 hrs.

Several second generation films were made, having different single component polyethylene resin (Dowlex and Affinity) in the pigmented core layer along with a small amount of Surlyn in the core layer for inter-layer adhesion. A noticeable improvement in the appearance of the jetness of the black was observed with the addition of a small amount of Surlyn in the core layer) ABA Type Structure with Surlyn in the "A" skin layers Core Layer Blend:

89.0% Dowlex 2036A LMDPE resin
7.0% Ampacet Black 190303
3.0% DuPont Surlyn 160.0% Ampacet PE Slip Concentrate # 10061

Skin Layer Thickness:

92.0% DuPont Surlyn 1605
4.0% Ampacet 10061
4.0% Ampacet 10561

(C) ABA Type Structure with Surlyn in the "A" Skin Layers

Core Layer Blend:

89.0% Dow Metallocene Affinity LMDPE 1030 HF resin
7.0% Ampacet Black 190303
3.0% DuPont Surlyn 160.0% Ampacet PE Slip Concentrate # 10061

| Hunter Color Lab Data | L | a | b | 60° Gloss (MD) |
|---|---|---|---|---|
| Black #1 | 7.7 | 0.1 | 0.4 | 83.4 |
| Black #2 | 8.6 | 0.2 | 0.7 | 84.9 |
| Black (PVC) | 6.7 | 0.0 | 0.5 | 98.0 |
| Xenon Durability | DELTA E > 5.0 | | Gloss Reduction > 25 pts. | |
| Black #1 | 2415 hrs. | | 1726 hrs. | |
| Black #2 | 3809 hrs. | | 1726 hrs. | |
| Black (PVC) | 4740 hrs. | | 3906 hrs. | |

EXAMPLE #19

This film structure was made by switching from Dow Metallocene Affinity LMDPE or Dowlex or blends of these with conventional MDPE (either MDPE made by Quantum, now EQUISTAR, or Huntsman now made by Huntsman), a single component MDPE resin was used to improve the sign cutting characteristics of the film so that the film would cut and weed at ¼ inch size letters.

A higher loading (e.g. 14,000 ppm) of U.V. stabilizer was used in the Surlyn skin layeR. Another feature that was incorporated into the film was that the bottom clear skin layer was now change to contain MDPE and U.V. stabilizer in place of Surlyn. The total film thickness is 3.0 mils, with a 2.4 mil core and 0.3 mil each skin layers. The film was a ABC type (A is Surlyn Layer, C is PSA—MDPE Layer, B is pigmented Core Layer).

(#1)

Core Layer Blend:

83.0% Quantum (now EQUISTAR) NA 285-003 MDPE resin
12.0% Ampacet Black PE Color Concentrate 190303
3.0% DuPont Surlyn 1605 Packaging Grade Surlyn
2.0% Ampacet # 10919

-continued

Surlyn (scuff resistant) Skin Layer Blend:

93.0% DuPont Surlyn 1605
7.0% Ampacet # 10561

Pressure Sensitive Adhesive Side Skin Layer Blend:

95.0% Quantum (now EQUISTAR) NA 285-003 MDPE resin
3.0% Ampacet # 10561
2.0% Ampacet 10919

(#2)

Core Layer Blend:

83.0% Huntsman (now Huntsman) PE-1080 MDPE resin
12.0% Ampacet Black 190303
3.0% DuPont Surlyn 1605 Packaging Grade Surlyn
2.0% Ampacet # 10919

Surlyn (scuff resistant) Skin Layer Blend:

93.0% DuPont Surlyn 1605
7.0% Ampacet # 10561

Pressure Sensitive Adhesive Side Skin Layer Blend:

95.0% Huntsman (now Huntsman) PE-1080 MDPE resin
3.0% Ampacet # 10561
2.0% Ampacet # 10919

| Hunter Color Lab Data | L | a | b | 60° Gloss (MD) |
|---|---|---|---|---|
| Black #1 | 7.4 | 0.6 | 0.9 | 84.3 |
| Black #2 | 7.6 | 0.2 | 0.8 | 85.8 |
| Black (PVC) | 6.7 | 0.0 | 0.5 | 98.0 |
| Xenon Durability | DELTA E > 5.0 | | Gloss Reduction > 25 pts. | |
| Black #1 | >3461 hrs. | | >3461 hrs. | |
| Black #2 | >3461 hrs. | | >3461 hrs. | |
| Black (PVC) | 4740 hrs. | | 3906 hrs. | |

| | 60° Gloss Readings (Cycle) | | | | |
|---|---|---|---|---|---|
| Taber Abrasion | 0 | 5 | 10 | 25 | 50 |
| Black #2 | 83 | 72 | 67 | 50 | 27 |
| Black (PVC) | 95 | 77 | 69 | 60 | 54 |

EXAMPLE #20

A series of three layer (ABC) films were made with skin layer that varied the amount of Surlyn. The films had a thickness of 3.0 mils, with the core layer being 2.4 mils and each skin layer being 0.3 mil. The film is an ABC type film where A is Surlyn Layer, C is PSA-MDPE Layer, B is pigmented Core Layer.

Core Layer Blend:

86.0% Huntsman (now Hunsman) PE-1080 MDPE resin
12.0% Ampacet Black + 190303
2.0% A,pacet # 10919

Pressure Sensitive Adhesive Skin Layer Bland:

95.0% Huntsman PE-1080 MDPE resin
3.0% Ampacet # 10561
2.0% Ampacet # 10919

Surlyn Skin Layer Film Blends:

| | |
|---|---|
| (1) 93.0% DuPont Surlyn 9120 | 7.0% Ampacet #10561 |
| (2) 93.0% DuPont Surlyn 8140 | 7.0% Ampacet #10561 |
| (3) 93.0% DuPont Surlyn AD 8546 | 7.0% Ampacet #10561 |
| (4) 93.0% DuPont Surlyn AD 8547 | 7.0% Ampacet #10561 |
| (5) 93.0% DuPont Surlyn AD 8548 | 7.0% Ampacet #10561 |
| (6) 93.0% DuPont Surlyn 1707 | 7.0% Ampacet #10561 |
| (7) 93.0% DuPont Surlyn 1605 | 7.0% Ampacet #10561 |

| Hunter Color Lab Data | L | a | b | 60° Gloss (MD) |
|---|---|---|---|---|
| 1 | 8.2 | 0.4 | 1.4 | 89.0 |
| 2 | 8.6 | 0.4 | 1.3 | 87.2 |
| 3 | 8.5 | 0.5 | 1.2 | 86.2 |
| 4 | 8.3 | 0.2 | 1.3 | 86.3 |
| 5 | 8.6 | 0.2 | 1.6 | 85.1 |
| 6 | 8.4 | 0.5 | 1.1 | 86.6 |
| 7 | 8.5 | 0.3 | 1.5 | 86.5 |
| Black (PVC) | 6.7 | 0.0 | 0.5 | 98.0 |

| Xenon Durability | DELTA E > 5.0 | Gloss Reduction > 25 pts. |
|---|---|---|
| 1 | 1196 | >1196 |
| 2 | >1196 | >1196 |
| 3 | >1196 | >1196 |
| 4 | 254 | >1196 |
| 5 | >1196 | >1196 |
| 6 | 571 | 780 |
| 7 | >1196 | >1196 |
| Black (PVC) | 4740 hrs. | 3906 hrs. |

| | 60° Gloss Readings (Cycle) | | | | |
|---|---|---|---|---|---|
| Taber Abrasion | 0 | 5 | 10 | 25 | 50 |
| 1 | 83 | 81 | 77 | 58 | 49 |
| 2 | 83 | 76 | 72 | 55 | 33 |
| 3 | 83 | 75 | 73 | 45 | 43 |
| 4 | 83 | 75 | 66 | 47 | 37 |
| 5 | 83 | 68 | 62 | 42 | 26 |
| Black (PVC) | 95 | 77 | 69 | 60 | 54 |

EXAMPLE #21

Another series of three layer ABC films were prepared with various amounts of Surlyn in the pigmented core layer. The ABC film had a thickness of 3.0 mils, where the core layer had a thickness of 2.4 mil and the skin layers are each 0.3 mil. The file is a ABC tyoe film where A is Surlyn Layer, C is PSA-MDPE Layer, and B is pigmented Core Layer.

Core Layer Blend:

| | |
|---|---|
| 92.0% | DuPont Surlyn 1920 "Golf Ball" Grade resin |
| 8.0% | Ampacet 700840 |

Pressure Sensitive Adhesive Skin Layer Blend:

| | |
|---|---|
| 95.0% | Huntsman PE-1080 MDPE resin |
| 3.0% | Ampacet # 10561 |
| 2.0% | Ampacet # 10919 |

Surlyn Skin Layer Film Blends:
Control

| | |
|---|---|
| 84.0% | Huntsman PE-1080 MDPE |
| 12.0% | Ampacet Black # 190303 |
| 4.0% | Ampacet # 10919 |

(No Surlyn in Core)

5% Surlyn in Core

| | |
|---|---|
| 79.0% | Huntsman PE - 1080 MDPE |
| 12.0% | Ampacet Black # 190303 |
| 4.0% | Ampacet # 10919 |
| 5.0% | DuPont Surlyn 9120 |

10% Surlyn in Core

| | |
|---|---|
| 74.0% | Huntsman PE - 1880 MDPE |
| 12.0% | Ampacet Black # 190303 |
| 4.0% | Ampacet # 10919 |
| 5.0% | DuPont Surlyn 9120 |

20% Surlyn in Core

| | |
|---|---|
| 64.0% | Huntsman PE - 1880 MDPE |
| 12.0% | Ampacet Black # 190303 |
| 4.0% | Ampacet # 10919 |
| 20.0% | DuPont Surlyn 9120 |

40% Surlyn in Core

| | |
|---|---|
| 54.0% | Huntsman PE - 1880 MDPE |
| 12.0% | Ampacet Black # 190303 |
| 4.0% | Ampacet # 10919 |
| 40.0% | DuPont Surlyn 9120 Huntsman |

| Hunter Color Lab Data (% Surlyn in Core layer) | L | A | b | 60° Gloss (MD) |
|---|---|---|---|---|
| 0% | 8.7 | 0.2 | 1.8 | 89.6 |
| 5% | 6.7 | 0.4 | 1.0 | 89.0 |
| 10% | 6.9 | 0.4 | 0.9 | 89.9 |
| 20% | 7.2 | 0.3 | 0.9 | 89.1 |
| 40% | 8.2 | 0.2 | 1.2 | 88.5 |
| Black (PVC) | 6.7 | 0.0 | 0.5 | 98.0 |

| Xenon Durability (% Surlyn in core layer) | DELTA E > 5.0 | Gloss Reduction > 25 pts. |
|---|---|---|
| 0% | >3047 | >3047 |
| 5% | 2890 | >3047 |
| 10% | 3047 | >3047 |
| 20% | 3047 | 3047 |
| Black (PVC) | 4740 hrs. | 3906 hrs. |

It is seen that 5.0% Surlyn in the core gives the lowest L number of all the blends.

EXAMPLE #22

A three layer, 3.0 mil film has a core layer (2.4 mils) and two skin layers (0.3 mil each.

Peelable Skin Layer

| | |
|---|---|
| 100% | polypropylene resin |

Skin Layer A

| | |
|---|---|
| 91.0% | DuPont Surlyn (golf ball Grade) 9120 (19% MAA) |
| 8% | Ampacet 10561 contains 16000 ppm UV Light Stabilizer Chemissorb 944 |
| 1% | Ampacet 10919 Processing Aid |

Core or Pigmented Layer

| | |
|---|---|
| 49% | Huntsman MDPE PE-1080 resin |
| 20% | Ampacet Black 190671 |
| 5% | DuPont Surlyn 9120 |
| 1% | Ampacet 10919 Processing Aid |
| 22% | Equistar EVA |
| 3% | Ampacet U.V. 10561 contains 6000 ppm light stabilizer Chemissorb 944 |

EXAMPLE #23

A four layer film is made which has a structure of ABAC. The film is 3.0 mils thick with a 2.4 mils thick core, 0.2 mil skin layer, 0.2 mil intermediate layer, and 0.2 mil adhesive skin layer.

Ourside Surlyn Layer

| | |
|---|---|
| 85% | DuPont Surlyn 1605 |
| 6.0% | Amacet Antistatic Conc. # 100320 (6.0% GMS loading) |
| 8.0% | Ampacet U.V. Conc. # 195.0% Ampacet Processing Aid Conc. 10919 |

Pigmented Core Layer:

| | |
|---|---|
| 30.0% | Ampacet White Conc. 110868 |
| 22.0% | EQUISTAR EVA 242 F |
| 1.0% | Ampacet U.V. Conc 10561 |
| 1.0% | Ampacet Process Aid Conc # 10919 |
| 45.0% | EQUISTAR MDPE NA 324-009 |

Inside (Intermediate) Surlyn Layer:

| | |
|---|---|
| 85.0% | DuPont Surlyn 1605 |
| 6.0% | Amacet Antistatic Conc. # 100320 (6.0% GMS loading) |
| 8.0% | Ampacet U.V. Conc. # 19561 |
| 1.0% | Ampacet Process Aid Conc. 10919 |

Adhesive Skin Layer:

| | |
|---|---|
| 73.0% | EQUISTAR MDPE NA 324-009 |
| 22.0% | EQUISTAR EVA 242 F |
| 1.0% | Ampacet Process Aid Conc 10919 |
| 2.0% | Ampacet U.V. Conc. #10561 |

EXAMPLE 24

A 2.7 mil, two layer film is prepared by coextruding a 2.4 mils core layer with a 0.3 mil skin layer.

Core layer

| | |
|---|---|
| 84.0 parts | Huntsman PE-1080 MDPE |
| 12.0 parts | Ampacet Black 190303 |

Skin Layer

| | |
|---|---|
| 85.0 parts | DuPont Surlyn 1605 |
| 6.0 parts | Ampacet Antastatic Conc. 100320 (6.0% GMS loading) |

EXAMPLE 25

A 3.0 mils, three layer film is prepare by coextruding a 2.4 mils core layer with a 0.3 mil first skin layer and a 0.3 mil second skin layer.

Core layer

| | |
|---|---|
| 84.0 parts | Huntsman PE-1080 MDPE |
| 12.0 parts | Ampacet Black 190303 |

First Skin Layer

| | |
|---|---|
| 85.0 parts | DuPont Surlyn 1605 |
| 6.0 parts | Ampacet Antastatic Conc. 100320 (6.0% GMS loading) |

Second Skin Layer

| | |
|---|---|
| 73.0 part | EQUISTAR MDPE NA 324-009 |
| 22.0 part | EQUISTAR EVA 242 F |
| 1 part | Ampacet Process Aid Conc 10919 |

EXAMPLE 26

A 3.0 mils, three layer film is prepare by coextruding a 2.4 mils core layer with a 0.3 mil first skin layer and a 0.3 mil second skin layer.

Core layer

| | |
|---|---|
| 84.0 parts | Huntsman PE-1080 MDPE |
| 12.0 parts | Ampacet Black 190303 |

First Skin Layer

| | |
|---|---|
| 85.0 parts | DuPont Surlyn 1605 |
| 6.0 parts | Ampacet Antastatic Conc. 100320 (6.0% GMS loading) |

Second Skin Layer

| | |
|---|---|
| 84.0 parts | Huntsman PE-1080 MDPE |
| 12.0 parts | Ampacet Black 10919 |

EXAMPLE 27

Topcoated films are prepared by roll coating the film of Example 26 with

A) a UV curable epoxy topcoat of the following:

| Tradename | Supplier | Description | Weight % |
|---|---|---|---|
| Cyracure UVR-6110 | Union Carbide | Epoxy Resin | 83.5% |
| Tone 301 | Union Carbide | Caprolactone Polyol | 10.0% |
| Cyracrure UVI-6974 | Union Carbide | Photoinitiator | 6.0% |
| Silivet L7604 | OSI | Wetting Agent | 0.5% |

B) a UV curable urethane based topcoat formulation of the following:

| Tradename | Supplier | Description | Weight % |
|---|---|---|---|
| CN 963B80 | Sartomer | urethane acrylate (aliphatic) | 75% |
| SR 238 | Sartomer | 1,6 hexanediol | 20.5% |
| Irgacure 184 | Ciba | photoinitiator | 3% |
| Tinuvin 1130 | Ciba | UV Stabilizer | 1% |
| Tinuvin 123 | Ciba | UV Stabilizer | 0.5% | c) a thermal plastic polyurethane topcoat of the following:

| Tradename | Supplier | Description | Weight % |
|---|---|---|---|
| Irostic 9827 | Morton Chemical | thermoplastic polyurethane | 12% |
| — | — | methyl, ethyl ketone | 38% |
| Irganox 1010 | Ciba | Antioxidant | 0.25% |
| Tinuvin 292 | Ciba | UV Stabilizer | 0.125% |
| Tinuvin 328 | Ciba | UV Stabilizer | 0.125% |
| — | — | Toluene | 25.5% |
| — | — | Isopropyl alcohol | 24% |

Sign Cutting Method

The inventive sign cutting method involves providing a pressure sensitive adhesive composite, the composite being comprised of the foregoing multilayered thermoplastic film adhered to a pressure sensitive adhesive laminate, cutting an image in the multilayered film, and transferring the image from the pressure sensitive adhesive composite to a substrate to provide for the desired graphic application. The inventive method is useful for providing signage applications involving a wide range of substrates and surface contours. These include long-term exterior identification signs, as well as decorative or commercial graphics on cars, trucks, boats, and the like. The image can be in any form including print, designs, and combinations thereof. The image can be clear, black, white or any desired color or combination of colors.

In one embodiment, the inventive sign cutting method involves the steps of: (A) providing the foregoing pressure sensitive adhesive composite; (B) cutting the multilayered thermoplastic film in the form of a desired image to provide needed portions of the multilayered film and unneeded portions of the multilayered film; (C) removing the unneeded portions of the multilayered film from the composite; (D) placing a pressure sensitive adhesive mask over the composite in contact with the needed portions with sufficient pressure to adhere the needed portions to the mask, the mask being in contact with the first thermoplastic skin layer of the needed portions; (E) separating the mask and the needed portions from the composite, the separated needed portions having the pressure sensitive adhesive adhered to the second thermoplastic skin layer of the needed portions; (F) placing the mask and the needed portions against the substrate to which the image is to be adhered, the pressure sensitive adhesive adhered to the second thermoplastic skin layer of the needed portions being in contact with the substrate; and (G) removing the mask from the needed portions leaving the needed portions adhered to the substrate.

Step (A) of the inventive method involves providing the pressure sensitive adhesive composite 10 or 10A discussed above. The composite is provided in the size required for the desired application. The film is often provided in roll form and can have any length required for the desired application. For example, lengths of 1 foot, 10 feet, 25 feet, 50 feet, 100 feet, 200 feet, or more can be used. The width is dependent upon the particular graphics machine being used and can be, for example, up to about 48 inches, or up to about 60 inches.

The cutting step (B) is performed using any technique known in the art for cutting an image from a thermoplastic film adhered to a pressure sensitive adhesive composite. This cutting step is typically performed using an appropriate graphics machine or sign making machine. Examples of suitable graphics machines or sign making machines that can be used include those available from Gerber under the trade designation GSP Graphix 4 and Rolland under the trade designations PNC-910, PNC-950, PNC-960, PNC-1210, PNC-1410 or PNC-1860. In cutting the desired image, the cutting knife or tool is set to cut the pressure sensitive adhesive composite 10 or 10A to a sufficient depth so that the multilayered thermoplastic film 12 or 12A as well as the pressure sensitive adhesive layer 30 attached to the multilayered film 12 or 12A are cut leaving the release liner 35 uncut. Establishing the proper depth of the cut is within the skill of the art. The cutting step is continued until the appropriate image has been cut in the composite. The cutting results in the formation of needed portions of the multilayered film forming the desired image adhered to the release liner, and unneeded portions comprising the remainder of the multilayered film adhered to the release liner.

Step (C) of the inventive method involves removing the unneeded portions of the multilayered film 12 or 12A and pressure sensitive adhesive 30 from the release liner 35, leaving only the needed portions of the multilayered film 12 or 12A and adhesive layer 30 adhered to the release liner 35. The remaining needed portions form the image that is ultimately desired. This removal step is sometimes referred to in the art as "weeding." Weeding involves peeling the unneeded portions of the multilayered film from the release liner leaving only the needed portions representing the final image adhered to the release liner.

Step (D) of the inventive method involves placing a pressure sensitive adhesive mask over the needed portions of the multilayered film 12 or 12A that remain adhered to the release liner 35. The pressure sensitive adhesive mask is comprised of a substrate with a pressure sensitive adhesive layer overlying one side of the substrate. The pressure sensitive adhesive mask can be comprised of any of the pressure sensitive adhesives and liner materials (i.e., paper, polymer film, and combinations thereof discussed above with the proviso that the pressure sensitive adhesive must be of sufficient strength to be able to separate the needed portions of the multilayered film from the release liner, but be of sufficient weakness to allow the needed portions of the multilayered film to adhere to the substrate to which the image is to be adhered during step (G). An example of a commercially available pressure sensitive adhesive mask that can be used is available from American Built-Rite under the trade designation 6792 Premask.

Step (E) involves separating the pressure sensitive adhesive premask and the needed portions of the multilayered film 12 or 12A and adhesive layer 30 from the release liner 35. The pressure sensitive adhesive mask is adhered to the first thermoplastic skin layer 18 of the needed portions. The pressure sensitive adhesive 30, which is adhered to the second thermoplastic skin layer 20 of the needed portions, remains adhered to the second skin layer 20 and is exposed.

Step (F) involves placing the mask with the adhered needed portions over the substrate to which the image is to be adhered with the needed portions in the position to which they are to be adhered. Typically, the mask is applied with sufficient pressure to ensure that the needed portions are securely adhered to the substrate.

Step (G) involves removing the pressure sensitive adhesive mask from the adhered needed portions leaving the needed portions adhered to the substrate in the form of the desired image. The pressure sensitive adhesive mask is typically pulled away slowly so as to not disturb the position of the needed portions on the substrate. The mask can then be discarded or used in subsequent applications.

The inventive method will now be described with reference to FIG. 7. FIG. 7 is comprised of illustrations labeled (a) through (j) disclosing the sequence of steps involved with the inventive method. Step (A) is depicted by illustration (a) of FIG. 7. Step (B) is depicted by illustration (b). Step (C) is depicted by illustrations (c) and (d). Step (D) is depicted by illustration (e). Step (E) is depicted by illustrations (f) and (g). Step (F) is depicted by illustration (h). Step (G) is depicted by illustrations (i) and (j). The pressure sensitive adhesive composite 10 illustrated in FIG. 1 is also depicted in illustration (a) of FIG. 7. The pressure sensitive adhesive composite 10 is comprised of a multilayered thermoplastic film 12 adhered to a pressure sensitive adhesive laminate 14. The multilayered film 12 has a thermoplastic core layer 16, which has a first side and a second side, and thermoplastic skin layer 18 overlying the first side of the core layer 16 and second thermoplastic skin layer 20 overlying the second side of the core layer 16. The adhesive laminate has a layer of a pressure sensitive adhesive 30 adhered to the skin layer 20, a layer of a release coating 32 overlying the pressure sensitive adhesive 30 and a backing liner 34 overlying the release coating layer 32. Release coating layer 32 and backing liner 34 combine to form release liner 35. The cutting step (B) is performed using a knife 60 and results in the formation of needed portion 62 and an unneeded portion 64 being formed in multilayered film 12. The unneeded portion 64 of the multilayered film 12 is separated from the release liner 35 as depicted in illustration (c) leaving needed portion 62 adhered to release liner 35 as depicted in illustration (d). Step (D) involves placing a pressure adhesive mask 40 over needed portion 62 as depicted in illustration (e). The pressure sensitive adhesive mask is comprised of substrate 42 and pressure sensitive adhesive layer 44 underlying substrate 42. The pressure sensitive adhesive mask 40 is applied to the skin layer 18 of the needed portion 62 with sufficient pressure so as to adhere to it. Step (E) involves separating the release liner 35 from the needed portion 62 and pressure sensitive adhesive mask 40 leaving the needed portion 62 adhered to the pressure sensitive adhesive mask 40 as depicted in illustration (g). The release liner 35 that is separated from the needed portion 62 as depicted in illustration (f) can be discarded. The pressure sensitive adhesive mask 40 with the needed portion 62 adhered to it as depicted in illustration (g) is placed over the substrate 50 upon which it is desired to place the desired image as depicted in illustration (h). Sufficient pressure is applied to the pressure sensitive adhesive mask 40 and needed portion 62 in order to adhere the needed portion 62 to the substrate 50. The pressure sensitive adhesive layer 30 adhered to the thermoplastic skin layer 20 of needed portion 62 contacts substrate 50 and secures needed portion 62 to substrate 50 as depicted in illustration (i). The pressure sensitive adhesive mask 40 is then separated from the needed portion 62 and substrate 50 as depicted in illustration (j) and either discarded or used again with subsequent procedures.

In a first embodiment, the invention relates to a die-cuttable, matrix-strippable, PSA composite construction which comprises (A) first and second continuous polymeric films, each having an upper surface and a lower surface, and each independently having a thickness of from about 0.1 to about 2 mils, the first and second films being separated by a thin continuous layer of material having a Young's Modulus less than the Young's Modulus of the first and second polymeric films, and (B) A substrate adhesive layer having an upper surface and a lower surface wherein the upper surface of the substrate adhesive layer is adhesively joined to the lower surface of the second film. Young's Modulus is measured according to ASTM Test Method D882.

It has been found that these constructions exhibit a greater stiffness than a construction of a single film having a thickness equal to the thicknesses of the two polymer films. The continuous layer of material used separate the two polymeric film layers in this embodiment and having a lower Young's Modulus than the adjacent first and second polymer films can comprise any number of materials such as, for example, polymeric films, thin foam materials, and more preferably, adhesives such as pressure sensitive adhesives. The thickness of the separation layer may generally range from about 0.02 to about 2 mils, and more often will be from about 0.02 to about 1.0 mil. The preferred separation layer is a continuous layer of a pressure sensitive adhesive such as the pressure sensitive adhesives described below. The use of a pressure sensitive adhesive separation layer also contributes to the pressure sensitive adhesive properties of the overall constructions of the invention. In the interest of minimizing costs, the continuous polymeric films can comprise a polyolefin or olefin blend which elongates under the use conditions and contributes to the adhesive properties.

In a second embodiment of the invention, the composite constructions comprise (A) a separation layer of polymeric film material having an upper surface and a lower surface, (B) a first skin layer of polymeric material having an ink printable upper surface and a lower surface, (C) a second skin layer of polymeric material having an upper surface and a lower surface, (D) a first stiffening layer between and joined to the upper surface of the separation layer and the lower surface of the first skin layer, and (E) a second stiffening layer between and joined to the lower surface of the separation layer and the second skin layer, wherein each of the first and second stiffening layers comprises a polymeric film material having a Young's Modulus that is greater than the Young's modulus of the separation layer and the skin layer on either side of the stiffening layer. The ratios of the thicknesses of the first skin/first stiffening/separation/second stiffening/second skin layers may vary over a wide range although the separation layer generally is the thickest layer. Ratios ranging from 1/1/96/1/1 to 15/5/60/5/15 are useful. A particularly preferred ratio is 10/5/70/5/10.

Such composites exhibit higher stiffnesses than similar composites where the stiffening layers are omitted. The composites generally are formed by coextrusion of the five layers of polymer material, and the composites may be combined with an adhesive layer and a release liner to form label stock which is die-cuttable, matrix-strippable and has sufficient stiffness to be dispensed over a peel-plate.

In the first embodiment, the first and second polymeric films of the composite constructions can be obtained from any polymeric material that is capable of being coextruded, and particularly polymeric materials that can be coextruded with a variety of adhesives, and more particularly, as described below, with pressure sensitive adhesives. For example, it may be desired that the polymeric film material have a solubility parameter that is inconsistent with or incompatible with that of the adhesive to prevent migration between the two layers when coextruded. Alternatively, the construction of the first embodiment can be prepared by other processes known to those skilled in the art. For example, the composites can be formed by applying an adhesive layer to a release surfaces of a removable substrate and sequentially deposition a layer of film-forming material, a second layer of adhesive (internal adhesive) and a second layer of film forming material. The various polymeric and adhesive materials can be applied to the surface of the first adhesive layer in the form of a hot melt, aqueous dispersion or solution by roll, spray, electrostatic, die or extrusion processes. The polymeric film material also should, when combined with the adhesive layer, provide a sufficiently self-supporting construction to facilitate label dispensing (label separation and application.) Preferably, the polymeric film material is chosen to provide the construction with the desired properties such as printability, die-cuttability, matrix-strippability, dispensability, etc.

The polymeric film materials useful in the composites of the first and second embodiments of the present invention include polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof. In one preferred embodiment, the polymeric film material is a polyolefin. The polyolefin film materials generally are characterized as having a melt index or melt flow rate of less than 30, more often less than 20, and most often less than 10 as determined by ASTM Test Method 1238.

The polyolefins which can be utilized as the polymeric film material include polymers and copolymers of ethylene, propylene, 1-butene, etc., or blends of mixtures of such polymers and copolymers. Preferably, the polyolefins comprise polymers and copolymers of ethylene and propylene. In another preferred embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymeric film material including low, medium, and high density polyethylenes. An example of a useful low density polyethylene (LDPE) is Huntsman 1017 available from Huntsman.

The propylene homopolymers which can be utilized as the polymeric film material in the constructions of the invention, either alone, or in combination with a propylene copolymer as described herein, include a variety of propylene homopolymers such as those having melt flow rates (MFR) from about 0.5 to about 20 as determined by ASTM Test D 1238, condition L. In one embodiment, propylene homopolymers having MFR's of less than 10, and more often from about 4 to about 10 are particularly useful and provide facestocks having improved die-cuttability. Useful propylene homopolymers also may be characterized as having densities in the range of from about 0.88 to about 0.92 g/cm$^3$. A number of useful propylene homopolymers are available commercially from a variety of sources, and some useful polymers include: 5A97, available from Union Carbide and having a melt flow of 12.0 g/10 min and a density of 0.90 g/cm$^3$; DX5E66, also available from Union Carbide and having an MFI of 8.8 g/1 0 min and a density of 0.90 g/cm$^3$; and WRD5-1057 from Union Carbide having an MFI of 3.9 g/10 min and a density of 0.90 g/cm$^3$. Useful commercial propylene homopolymers are also available from Fina and Montel.

A variety of propylene copolymers are available and useful in the invention. The propylene copolymers generally comprise copolymers of propylene and up to 10% or even 20% by weight of at least one other alpha olefin such as ethylene, 1-butene, 1-pentene, etc. In one preferred embodiment, the propylene copolymers are propylene-ethylene copolymers with ethylenic contents with from about 0.2% to about 10% by weight. Such copolymers are prepared by techniques well known to those skilled in the art, and these copolymers are available commercially from, for example, Union Carbide. A propylene-ethylene copolymer containing about 3.2% by weight of ethylene is available from Union Carbide under the designation D56D20. Another Union Carbide propylene-ethylene copolymer is D56D8, which contains 5.5% by weight of ethylene.

Acrylate polymers and copolymers and alkylene vinyl acetate resins (e.g., EVA polymers) also are useful as the film forming materials in the preparation of the coextruded adhesive constructions of the invention. Commercial examples of available polymers include Escorene UL-7520, a copolymer of ethylene with 19.3% vinyl acetate (Exxon); Nucrell 699, an ethylene copolymer containing 11% of methacrylic acid (duPont); etc.

Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

The polymeric film material may contain inorganic fillers and other organic or inorganic additives to provide desired properties such asappearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid aceptors, etc.

Various nucleating agents and pigments can be incorporated into the films of the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), and stiffness, and the diecuttability of the film. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polyproylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the film formulations of the present invention are generally quite small and range from about 100 to about 6000 ppm of the film. Preferably the amount of nucleating agent be within the range of about 1000 to about 5000 ppm.

The polymeric film material for the first polymeric film (first embodiment) and the first skin layer (second embodiment) is chosen to provide a continuous polymer film in the product with the desired properties such as improved printability, weatherability, strength, water resistance, abrasion resistance, gloss, die-cuttability, and matrix strippability. It is particularly desirable that the surface of the first film and first skin layer can be printed or adapted to be printed with inks using printing techniques such as flexographic printing, screen printing, offset lithography, letter press, thermal transfer, etc., and that the applied ink has acceptable adhesion to the surface of the film of the adhesive construction. The choice of polymeric film forming material also is determined by its physical properties such as melt viscosity, high speed tensile strength, percent elongation etc. As will be discussed in more detail below, coextrusion of the polymeric film materials and the adhesives to form the coextrudate of the first embodiment is facilitated when the melt viscosities of the two materials, i.e., the polymeric film material of the first layer and the adhesive material, are similar. Thus, the choice of polymeric film material to be utilized in the formation of the coextruded adhesive constructions of the present invention may be dependent upon the melt viscosity of the adhesive being coextruded with the polymeric film forming material. In the first embodiment, the polymeric film material of the first layer preferably has a hot melt viscosity that is within a factor of from about 0.07 to about 15 times, more often greater than 1 to about 15 times, and preferably from 1 up to about 10 times the hot melt viscosity of the adhesive at the shear rates incurred in the coextrusion process.

The thicknesses of the polymer film layers are from about 0.1 to about 1.5 or even 2.0 mils. More often the thicknesses of the films are from about 0.2 to about 1.0 mil. A thickness of about 0.5 mils is particularly useful. The overall thickness of the composite is from about 0.5 mil to about 2.5 mils or even 3.0 mils.

The invention as described herein encompasses a core layer useful for signage. The core layer may be protected by an abrasion resistant skin layer. The skin layer may be covered by a topcoat layer which increase abrasion resistance or which provides for ease of printing. The core layer may be only one polymer or a blend of polymers. The core layer may have a second skin layer on its opposite side to provide stiffness and processing advantages. An intermediate layer, such as a stiffening layer, oppacifying layer, adhesive layer, and/or regrind layer may be positioned between the core layer and the second skin layer. The inventors have found that the addition of these additional layers provides products which have good stability for signage applications.

In one embodiment, the invention relates to an electronic cutting film, comprising (a) a core layer comprising polyolefin and having opposing major surfaces; (b) an abrasion resistant layer disposed on one major surface; and (c) an adhesive priming layer disposed on an opposing major surface. The caliper of the core layer ranges from about 50% to about 80% of caliper of the film; wherein the caliper of the abrasion resistant layer ranges from about 5% to about 25% of caliper of the film; wheein the caliper of the adhesive priming layer ranges from about 5% to about 30% of caliper of the film; and wherein the caliper of the film ranges from about 30 microns to about 150 microns. The abrasion resistant layer comprises an abrasion resistant ionomeric resin. The adhesive priming layer comprises ethylene vinyl acetate. The abrasion resistant layer also provides graffiti resistance. The film further comprises an adhesive layer disposed on the adhesive priming layer. The film further comprises a release liner disposed on the adhesive layer. The invention also relates to a method of making a film comprising the steps of (a) feeding three extrudable resins into a die having three slits; (b) co-extruding the three resins through the die to form the film. Another means for preparing the film, involves (a) cutting the film into a desired pattern; (b) placing the film on a substrate; and (c) removing undesired film from the pattern.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayered thermoplastic film, comprising:

a thermoplastic core layer having a first side and a second side, the core layer comprising:
(a) a polyolefin having a density in the range of about 0.89 to about 0.97 grams per cubic centimeter;
(b) from about 2% to about 25% by weight of a second polymeric material selected from ionomers derived from sodium, lithium or zinc and an ethylene/unsaturated carboxylic acid copolymer; and
(c) a light stabilizer at a concentration of about 1000 to about 10,000 ppm based on the weight of the core layer;

at least one abrasion resistant first thermoplastic skin layer overlying the first side of the core layer;

at least one second thermoplastic skin layer overlying the second side of the core layer, and at least one layer of a pressure sensitive adhesive overlying the second thermoplastic skin layer, wherein the composition of the core layer is different from the composition of the skin layers, and the core layer and the skin layers are characterized by the absence of PVC.

2. The film of claim 1, wherein the core comprises from about 2% to about 10% by weight of the second polymeric material.

3. The film of claim 1, wherein the core layer further comprises:
(c) from about 1% to about 45% by weight of a third polymeric material selected from ethylene/vinyl acetate copolymers, acid modified ethylene/vinyl acetate copolymers, anhydride modified ethylene/vinyl acetate copolymers, acrylate modified ethylene/vinyl acetate copolymers, anhydride modified polyolefins, acid modified ethylene acrylate polymers and anhydride modified ethylene acrylate polymers.

4. The film of claim 3, wherein the core comprises from about 20% to about 40% by weight of the third polymeric material.

5. The film of claim 1, further comprising a clear topcoat layer which overlies the first thermoplastic skin layer, wherein the clear topcoat layer is characterized by the absence of PVC.

6. The film of claim 1, wherein a release liner overlies the layer of pressure sensitive adhesive.

7. The film of claim 1, further comprising an opacifying layer between the core layer and the second skin layer.

8. The film of claim 7, wherein the opacifying layer comprise a white pigment, a black pigment or a mixture thereof.

9. The film of claim 1, wherein the first skin layer is comprised of an ionomer derived from sodium, lithium or zinc and an ethylene/unsaturated carboxylic acid copolymer.

10. The film of claim 3, wherein the third polymeric material is an ethylene/vinyl acetate copolymer.

11. A multilayered thermoplastic film, comprising:
a thermoplastic core layer having a first side and a second side, the core layer comprising:
(a) a polyolefin having a density in the range of about 0.89 to about 0.97 grams per cubic centimeter;
(b) from about 2% to about 10% by weight of a second polymeric material selected from ionomers derived from sodium, lithium or zinc and an ethylene/unsaturated carboxylic acid copolymer,
(c) from about 1% to about 40% by weight of a third polymeric material selected from ethylene/vinyl acetate copolymers, acid modified ethylene/vinyl acetate copolymers, anhydride modified ethylene/vinyl acetate copolymers, acrylate modified ethylene/vinyl acetate copolymers, anhydride modified polyolefins, acid modified ethylene acrylate polymers and anhydride modified ethylene acrylate polymers; and
(d) a light stabilizer at a concentration of about 1000 to about 10,000 ppm based on the weight of the core layer;
at least one abrasion resistant first thermoplastic skin layer overlying the first side of the core layer;
at least one second thermoplastic skin layer overlying the second side of the core layer, and
at least one layer of pressure sensitive adhesive overlying the second thermoplastic skin layer,
wherein the composition of the core layer is different from the composition of the skin layers, and the core layer and the skin layers are characterlzed by the absence of PVC.

12. The film of claim 11, wherein the core comprises from about 20% to about 40% by weight of the third polymeric material.

13. The film of claim 11, further comprising a clear topcoat layer which overlies the first thermoplastic skin layer, wherein the clear topcoat layer is characterized by the absence of PVC.

14. The film of claim 11, wherein a release liner overlies the layer of pressure sensitive adhesive.

15. The film of claim 11, further comprising an opacifying layer between the core layer and the second skin layer.

16. The film of claim 15, wherein the opacifying layer comprises a white pigment, a black pigment or a mixture thereof.

17. The film of claim 11, wherein the first skin layer is comprised of an ionomer derived from sodium, lithium or zinc and an ethylene/unsaturated carboxylic acid copolymer.

18. The film of claim 11, wherein the third polymeric material is an ethylene/vinyl acetate copolymer.

19. An unoriented multilayered thermoplastic film, comprising:
a thermoplastic core layer having a first side and a second side, the core layer comprising:
(a) a polyolefin having a density in the range of about 0.89 to about 0.97 grams per cubic centimeter;
(b) from about 3% to about 10% by weight of a second polymeric material selected from ionomers derived from sodium, lithium or zinc and an ethylene/methacrylic acid copolymer,
(c) from about 1% to about 40% by weight of a third polymeric material selected from ionomers derived from sodium, lithium or zinc and an ethylene/unsaturated carboxylic acid copolymer,
(d) a light stabilizer at a concentration of about 1,000 to about 10,000 ppm based on the weight of the of core layer;
an abrasion and scuff resistant clear first thermoplastic skin layer overlying the first side of the core layer, the first skin layer comprising a light stabilizer at a concentration of about 2,000 to about 20,000 ppm based on the weight of the first skin layer;
a clear second thermoplastic skin layer overlying the second side of the core layer; the second skin layer comprising a light stabilizer at a concentration of about 1,000 to about 15,000 ppm based on the weight of the second skin layer; and
at least one layer of pressure sensitive adhesive overlying the second thermoplastic skin layer;
wherein the composition of the core layer is different from the composition of the skin layers, and the core layer and the skin layers are characterized by the absence of PVC.

20. The film of claim 19, wherein a clear topcoat layer overlies the first thermoplastic skin layer, the clear topcoat layer being characterized by the absence of PVC.

21. The film of claim 19, wherein the core layer and the skin layers comprise a coextrudate.

22. The film of claim 19, wherein the first skin layer is comprised of an ionomer derived from sodium, lithium or zinc and an ethylene/methacrylic acid copolymer.

23. The film of claim 19, further comprising an opacifying layer between the core layer and the second skin layer.

24. The film of claim 23, wherein the opacifying layer comprises a white pigment, a black pigment or a mixture thereof.

25. The multilayer film of claim 1 wherein the multilayer film is unoriented.

26. An unoriented multilayered thermoplastic film, comprising:
a thermoplastic core layer having a first side and a second side, the core layer comprising:
(a) a polyolefin having a density in the range of about 0.89 to about 0.97 grams per cubic centimeter; and
(b) from about 2% to about 25% by weight of a second polymeric material selected from ionomers derived from sodium, lithium or zinc and an ethylene/unsaturated carboxylic acid copolymer;
at least one abrasion resistant first thermoplastic skin layer overlying the first side of the core layer;
at least one second thermoplastic skin layer overlying the second side of the core layer; and
at least one layer of a pressure sensitive adhesive overlying the second thermoplastic skin layer,
wherein the composition of the core layer is different from the composition of the skin layers, and the core layer and the skin layers are characterized by the absence of PVC.

27. The film of claim 26, wherein a release liner overlies the layer of pressure sensitive adhesive.

28. An unoriented multilayered thermoplastic film, comprising:
a thermoplastic core layer having a first side and a second side, the core layer comprising:
(a) a polyolefin having a density in the range of about 0.89 to about 0.97 grams per cubic centimeter;
(b) from about 2% to about 10% by weight of a second polymeric material selected from ionomers derived from sodium, lithium or zinc and an ethylene/unsaturated carboxylic acid copolymer, and (c) from about 1% to about 40% by weight of a third polymeric material selected from ethylene/vinyl acetate copolymers, acid modified ethylene/vinyl acetate copolymers, anhydride modified ethylene/vinyl acetate copolymers, acrylate modified ethylene/vinyl acetate copolymers, anhydride modified polyolefins, acid modified ethylene acrylate polymers and anhydride modified ethylene acrylate polymers;

at least one abrasion resistant first thermoplastic skin layer overlying the first side of the core layer;

at least one second thermoplastic skin layer overlying the second side of the core layer; and at least one layer of pressure sensitive adhesive overlying the second skin layer;

wherein the composition of the core layer is different from the composition of the skin layers, and the core layer and the skin layers are characterized by the absence of PVC.

29. The film of claim 28, wherein a release liner overlies the layer of pressure sensitive adhesive.

* * * * *